(12) United States Patent
Argyropoulos

(10) Patent No.: US 11,392,923 B2
(45) Date of Patent: *Jul. 19, 2022

(54) METHOD AND SYSTEM FOR ENABLING A PAYMENT

(71) Applicant: PAROUSYA TECHNOLOGIES PTY LTD, Ivanhoe (AU)

(72) Inventor: Arthur Argyropoulos, Ivanhoe (AU)

(73) Assignee: PAROUSYA TECHNOLOGIES PTY LTD, Ivanhoe (AU)

( * ) Notice: Subject to any disclaimer, the term of this patent is extended or adjusted under 35 U.S.C. 154(b) by 129 days.

This patent is subject to a terminal disclaimer.

(21) Appl. No.: 16/841,092

(22) Filed: Apr. 6, 2020

(65) Prior Publication Data

US 2020/0234273 A1 Jul. 23, 2020

Related U.S. Application Data

(63) Continuation of application No. 15/124,661, filed as application No. PCT/AU2015/000312 on May 26, 2015, now Pat. No. 10,657,515.

(Continued)

(51) Int. Cl.
*G06Q 20/32* (2012.01)
*G06Q 20/20* (2012.01)
*G06Q 20/42* (2012.01)

(52) U.S. Cl.
CPC ......... *G06Q 20/327* (2013.01); *G06Q 20/202* (2013.01); *G06Q 20/325* (2013.01); *G06Q 20/425* (2013.01)

(58) Field of Classification Search
CPC .................................................. G06Q 20/00

(Continued)

(56) References Cited

U.S. PATENT DOCUMENTS 6,260,027 B1 * 7/2001 Takahashi ............. G06Q 20/02
 705/64
7,099,850 B1 * 8/2006 Mann, II ............... G06Q 20/16
 380/28

(Continued)

FOREIGN PATENT DOCUMENTS

WO WO 2013/048322 A1 4/2013
WO WO 2014/082134 A1 6/2014

OTHER PUBLICATIONS

International Search Report dated Aug. 20, 2015 in International Application No. PCT/AU2015/000312.

(Continued)

*Primary Examiner* — Kirsten S Apple
(74) *Attorney, Agent, or Firm* — Knobbe, Martens, Olson & Bear, LLP

(57) ABSTRACT

A method of enabling a payment between a payor using a mobile device and one of a plurality of payees using respective payee devices, comprising: monitoring a first communication channel for receipt of a broadcast of a first identifier corresponding to one of the plurality of payee devices; upon receipt of the first identifier, generating an identifier notification comprising the first identifier and a second identifier corresponding to the mobile device, and transmitting the identifier notification from the mobile device to a payment processor over a second communication channel; in response to receipt of the identifier notification transmitted from the mobile device at the payment processor, associating the second identifier of the identifier notification with the first identifier of the identifier notification in a payment processor memory of the payment processor; generating a payment request comprising the second identifier, and transmitting the payment request from the mobile device to the payment processor; in response to receipt of the payment request transmitted from the mobile device, gen- (Continued)

erating a payment notification in respect of the payment request, and transmitting the payment notification from the payment processor to the payee device corresponding to the first identifier associated with the second identifier.

20 Claims, 7 Drawing Sheets

Related U.S. Application Data

(60) Provisional application No. 62/017,556, filed on Jun. 26, 2014.

(58) Field of Classification Search
USPC .......................................................... 705/38
See application file for complete search history.

(56) References Cited

U.S. PATENT DOCUMENTS

| | | | | |
|---|---|---|---|---|
| 7,203,315 | B1* | 4/2007 | Livesay | G06Q 30/0603 380/255 |
| 8,452,654 | B1* | 5/2013 | Woofers | G06Q 30/0234 705/14.34 |
| 8,583,549 | B1* | 11/2013 | Mohsenzadeh | G06Q 30/0238 705/39 |
| 8,606,640 | B2* | 12/2013 | Brody | G06Q 30/0613 705/26.1 |
| 8,756,161 | B2 | 6/2014 | Hasson | |
| 8,880,540 | B1* | 11/2014 | Sampson | G06K 9/68 707/756 |
| 2002/0010666 | A1* | 1/2002 | Wright | G06Q 20/102 705/34 |
| 2002/0046341 | A1* | 4/2002 | Kazaks | G06Q 20/12 713/182 |
| 2003/0195834 | A1* | 10/2003 | Hillis | G06Q 40/04 705/37 |
| 2004/0122685 | A1* | 6/2004 | Bunce | G06Q 20/12 705/67 |
| 2004/0181453 | A1* | 9/2004 | Ray | G06Q 20/346 705/16 |
| 2005/0250538 | A1* | 11/2005 | Narasimhan | G07F 7/0886 455/558 |
| 2006/0006226 | A1* | 1/2006 | Fitzgerald | G06Q 20/322 235/380 |
| 2006/0208065 | A1* | 9/2006 | Mendelovich | G06Q 30/02 235/380 |
| 2006/0274896 | A1* | 12/2006 | Livesay | H04L 63/0421 380/255 |
| 2007/0255564 | A1* | 11/2007 | Yee | G10L 17/24 704/246 |
| 2007/0291995 | A1* | 12/2007 | Rivera | G06F 21/35 382/115 |
| 2008/0059328 | A1* | 3/2008 | McCarty | G06Q 30/0601 705/26.1 |
| 2008/0065531 | A1* | 3/2008 | Smith | G06Q 20/3255 705/39 |
| 2008/0154772 | A1* | 6/2008 | Carlson | G06Q 20/3223 705/44 |
| 2009/0201850 | A1 | 8/2009 | Davis et al. | |
| 2009/0240626 | A1* | 9/2009 | Hasson | G06Q 20/204 705/75 |
| 2009/0281948 | A1* | 11/2009 | Carlson | G06Q 20/40 705/44 |
| 2010/0061294 | A1 | 3/2010 | Proctor, Jr. et al. | |
| 2010/0191570 | A1* | 7/2010 | Michaud | G06Q 30/0204 705/7.33 |
| 2010/0205091 | A1* | 8/2010 | Graziano | G06Q 20/24 705/40 |
| 2010/0320266 | A1 | 12/2010 | White | |
| 2011/0201306 | A1* | 8/2011 | Ali Al-Harbi | G06Q 20/3223 455/411 |
| 2011/0231292 | A1* | 9/2011 | McCown | G06Q 30/06 705/27.1 |
| 2011/0251892 | A1 | 10/2011 | Laracey | |
| 2011/0276418 | A1* | 11/2011 | Velani | G06Q 20/3276 705/16 |
| 2011/0288922 | A1* | 11/2011 | Thomas | G06Q 30/02 705/14.23 |
| 2012/0130895 | A1 | 5/2012 | Granbery et al. | |
| 2012/0157042 | A1* | 6/2012 | McCanna | G06Q 20/405 455/407 |
| 2012/0253906 | A1* | 10/2012 | Lapica | G06Q 30/00 705/14.23 |
| 2012/0271712 | A1* | 10/2012 | Katzin | G06Q 20/20 705/14.51 |
| 2013/0030934 | A1* | 1/2013 | Bakshi | G06Q 20/425 705/18 |
| 2013/0097079 | A1* | 4/2013 | Bruder | G06Q 20/20 705/44 |
| 2013/0210461 | A1 | 8/2013 | Moldavsky et al. | |
| 2013/0217332 | A1 | 8/2013 | Altman et al. | |
| 2013/0281110 | A1 | 10/2013 | Zelinka | |
| 2013/0282438 | A1* | 10/2013 | Hunter | H04W 12/084 705/7.32 |
| 2014/0012701 | A1* | 1/2014 | Wall | G06Q 20/3224 705/26.8 |
| 2014/0135042 | A1 | 5/2014 | Buchheim et al. | |
| 2014/0164082 | A1* | 6/2014 | Sun | G06Q 30/02 705/14.16 |
| 2014/0249999 | A1* | 9/2014 | Johnson | G06Q 20/0855 705/39 |
| 2014/0365304 | A1* | 12/2014 | Showers | G01S 5/0252 705/14.55 |
| 2015/0046271 | A1* | 2/2015 | Scholl | G06Q 20/202 705/15 |
| 2015/0186871 | A1* | 7/2015 | Laracey | G06Q 30/06 705/41 |
| 2015/0220914 | A1* | 8/2015 | Purves | G06Q 20/36 705/26.8 |
| 2015/0220924 | A1* | 8/2015 | Bakker | G06Q 20/327 705/14.27 |
| 2016/0098696 | A1* | 4/2016 | Sundaram | G06Q 20/10 705/39 |
| 2016/0117910 | A1* | 4/2016 | Rajala | H04W 4/021 340/539.13 |
| 2016/0224972 | A1* | 8/2016 | Li | G06Q 20/3223 |
| 2017/0032354 | A1* | 2/2017 | Tilahun | G06Q 20/3278 |
| 2017/0098208 | A1* | 4/2017 | Argyopoulos | H04W 4/80 |

OTHER PUBLICATIONS

International Preliminary Report on Patentability dated Nov. 8, 2016 for International Application No. PCT/AU2015/000312 filed May 26, 2015.
Extended European Search Report dated May 19, 2017 in related European Application No. 15811371.2, in 9 pages.
Communication pursuant to Article 94(3) EPC dated Jun. 20, 2018 in related European Application No. 15811371.2, in 2 pages.
Extended European Search Report dated Apr. 28, 2020 in European Application No. 20165105.6, in 8 pages.

* cited by examiner

METHOD AND SYSTEM FOR ENABLING A PAYMENT

CROSS REFERENCE TO RELATED APPLICATIONS

The present application is a continuation of U.S. patent application Ser. No. 15/124,661, filed Sep. 8, 2016, which is a U.S. national phase application under 35 U.S.C. § 371 of International Application No. PCT/AU2015/000312, filed on May 26, 2015 and published as WO 2015/196236 A1 on Dec. 30, 2015, which claims priority to U.S. Provisional Application No. 61/017,556, filed on Jun. 26, 2014. The content of each of these applications is incorporated herein by reference in its entirety.

FIELD

The invention relates to methods and systems involving a plurality of identifier transmitters. For example, the invention relates to a method and system for enabling a payment between a payor using a mobile device and one or more of a plurality of payees corresponding to respective ones of the identifier transmitters, and is of particular but by no means exclusive application in enabling a payment between a passenger using a smartphone in a taxi and one of a plurality of drivers of respective taxis. In another example, the invention relates to a method and system for identifying one of a plurality of service providers corresponding to respective ones of the identifier transmitters, and is of particular but by no means exclusive application in identifying one of a plurality of drivers of respective taxis.

BACKGROUND

In Australia and many parts of the world, taxi drivers (including drivers of limousines or other chauffeured vehicles) accept payment made in cash or using a charge or credit card via an electronic payment device. A receipt of payment must be provided by a driver of a taxi to a passenger of the taxi if payment for a trip is made by the passenger using a charge or credit card. The receipt must include details of the driver and details of the taxi. Payment for a trip usually takes place at the end of the trip, but it is not unusual for taxi drivers to request for payment (such as a partial upfront advance) at the beginning of the trip. It is also possible for a payment to be made during a trip.

There is a need for an alternative or improved method of enabling payments between passengers and drivers.

SUMMARY OF INVENTION

The invention provides a method of enabling a payment between a payor using a mobile device and one of a plurality of payees using respective payee devices, comprising:

monitoring a first communication channel for receipt of a broadcast of a first identifier corresponding to one of the plurality of payee devices;

upon receipt of the first identifier, generating an identifier notification comprising the first identifier and a second identifier corresponding to the mobile device, and transmitting the identifier notification from the mobile device to a payment processor over a second communication channel;

in response to receipt of the identifier notification transmitted from the mobile device at the payment processor, associating the second identifier of the identifier notification with the first identifier of the identifier notification in a payment processor memory of the payment processor;

generating a payment request comprising the second identifier, and transmitting the payment request from the mobile device to the payment processor;

in response to receipt of the payment request transmitted from the mobile device, generating a payment notification in respect of the payment request, and transmitting the payment notification from the payment processor to the payee device corresponding to the first identifier associated with the second identifier.

In an embodiment, the first identifier is an identifier of one of the payees or payee devices, and the second identifier is an identifier of the payor or mobile device.

In an embodiment, the payment request is transmitted from the mobile device to the payment processor over the second communication channel.

In an embodiment, the method further comprises, in response to receipt of the payment notification transmitted from the payment processor, generating payment information in respect of the payment request, and transmitting the payment information from the payee device to the payment processor.

In an embodiment, the method further comprises:

receiving a payee input to generate and transmit the payment information, wherein the payment information is generated and transmitted from the payee device to the payment processor in response to receipt of the payee input.

In an embodiment, the method further comprises, in response to receipt of the payment information transmitted from the payee device, generating modified payment information based on the payment information, and transmitting the modified payment information from the payment processor to the mobile device.

In an embodiment, the method further comprises, in response to receipt of the modified payment information from the payment processor, controlling the mobile device to display the modified payment information.

In an embodiment, the modified payment information is displayed by an application implemented on or by the mobile device.

In an embodiment, the method further comprises:

transmitting the first identifier from the payee device to one of a plurality of first identifier transmitters; and upon receipt of the first identifier from the payee device to the first identifier transmitter, broadcasting the broadcast of the first identifier from the first identifier transmitter over the first communication channel.

In an embodiment, the method further comprises controlling the mobile device to display a second identifier request, in response to receipt from the first identifier transmitter of the broadcast of the first identifier.

In an embodiment, the second identifier request comprises payee information relating to the payee device corresponding to the first identifier.

In an embodiment, the broadcast of the first identifier comprises a broadcast identifier, and the method further comprises determining that the broadcast identifier corresponds to a designated broadcast identifier.

In an embodiment, the broadcast identifier is a universally unique identifier (UUID) and the designated broadcast identifier is a designated UUID.

In an embodiment, the method further comprises:

receiving a first payor input to generate and transmit the identifier notification, wherein the identifier notification is generated and transmitted from the mobile device to the payment processor in response to receipt of the first payer input.

In an embodiment, the method further comprises:
receiving a second payor input to generate and transmit the payment request,
wherein the payment request is generated and transmitted from the mobile device to the payment processor in response to receipt of the second payor input.

In an embodiment, the first communication channel is a short-range communication channel.

In an embodiment, the first communication channel is a Bluetooth Low Energy communication channel.

In an embodiment, the first communication channel has a communication range of at least 1 meter.

In an embodiment, the first communication channel has a maximum communication range of about 100 meters.

In an embodiment, the first communication channel is a maximum data rate of about 1 megabits-per-second.

In an embodiment, the first communication channel has a peak current consumption of at most 15 milliamperes.

In an embodiment, the first communication channel and the second communication channel are different communication channels.

In an embodiment, the second communication channel is a mobile cellular communication channel.

In an embodiment, the second communication channel is a wireless local area network communication channel.

In an embodiment, the payee devices are located in different locations.

In an embodiment, each of the payee devices is a smartphone.

In an embodiment, the mobile device is a smartphone.

The invention also provides a system for enabling a payment between a payor and one of a plurality of payees, comprising:
a plurality of payee devices for respective use by the payees, each payee device corresponding to a first identifier for broadcast over a first communication channel;
a mobile device for use by the payor, and arranged to:
monitor the first communication channel for receipt of a broadcast of the first identifier corresponding to one of the payee device devices;
upon receipt of the first identifier, generate an identifier notification comprising the first identifier and a second identifier corresponding to the mobile device, and transmit the identifier notification over a second communication channel; and
generate a payment request comprising the second identifier, and transmit the payment request;
to a payment processor in communication with the mobile device and the payee devices, and arranged to:
in response to receipt of the identifier notification transmitted from the mobile device over the second communication channel, associate the second identifier of the identifier notification with the first identifier of the identifier notification in a memory (for example, in a memory associated with the payment processor); and
in response to receipt of the payment request transmitted from the mobile device, generate a payment notification in respect of the payment request, and transmit the payment notification to the payee device corresponding to the first identifier associated with the second identifier.

In an embodiment, the first identifier is an identifier of one of the payees or payee devices, and the second identifier is an identifier of the payor or mobile device.

In an embodiment, the payee device corresponding to the first identifier associated with the second identifier is arranged to, in response to receipt of the payment notification transmitted from the payment processor, generate payment information in respect of the payment request, and transmit the payment information to the payment processor.

In an embodiment, the payee device corresponding to the first identifier associated with the second identifier is arranged to receive a payee input to generate and transmit the payment information, and the payment information is generated and transmitted from the payee device to the payment processor in response to receipt of the payee input.

In an embodiment, the payment processor is arranged to, in response to receipt of the payment information transmitted from the payee device, generate modified payment information based on the payment information, and transmit the modified payment information to the mobile device.

In an embodiment, the mobile device is arranged to, in response to receipt of the modified payment information from the payment processor, display the modified payment information.

In an embodiment, the modified payment information is displayed by an application implemented on or by the mobile device.

In an embodiment, each payee device is arranged to transmit a first identifier corresponding to the payee device to one of a plurality of first identifier transmitters, and each identifier transmitter is arranged to, upon receipt of the first identifier from a payee device to the first identifier transmitter, broadcast the first identifier received from the payee device over the first communication channel.

In an embodiment, the mobile device is arranged to display a second identifier request, in response to receipt from the first identifier transmitter of the broadcast of the first identifier.

In an embodiment, the second identifier request comprises payee information relating to the payee device corresponding to the first identifier.

In an embodiment, the broadcast of the first identifier comprises a broadcast identifier, and the mobile device is arranged to determine that the broadcast identifier.

In an embodiment, the broadcast identifier is a universally unique identifier (UUID) and the designated broadcast identifier is a designated UUID.

In an embodiment, the mobile device is arranged to receive a first payor input to generate and transmit the identifier notification, and
wherein the identifier notification is generated and transmitted from the mobile device to the payment processor in response to receipt of the first payor input.

In an embodiment, the mobile device is arranged to receive a second payor input to generate and transmit the payment request, wherein the payment request is generated and transmitted from the mobile device to the payment processor in response to receipt of the second payor input.

In an embodiment, the first communication channel is a short-range communication channel.

In an embodiment, the first communication channel is a Bluetooth Low Energy communication channel.

In an embodiment, the first communication channel has a communication range of at least 1 meter.

In an embodiment, the first communication channel has a maximum communication range of about 100 meters.

In an embodiment, the first communication channel is a maximum data rate of about 1 megabits-per-second.

In an embodiment, the first communication channel has a peak current consumption of at most 15 milliamperes.

In an embodiment, the first communication channel and the second communication channel are different communication channels.

In an embodiment, the second communication channel is a bile cellular communication channel.

In an embodiment, the second communication channel is a wireless local area network communication channel.

In an embodiment, the payee devices are located in different locations.

In an embodiment, each of the payee devices is a smartphone.

In an embodiment, the mobile device is a smartphone.

The invention also provides a payment processor for enabling a payment between a payor using a mobile device and one of a plurality of payees using respective payee devices, comprising:
  a communication interface arranged to:
  receive, from the mobile device over a second communication channel, an identifier notification comprising a first identifier corresponding to one of the plurality of payee devices and a second identifier corresponding to the mobile device, the first identifier being previously broadcast to the mobile device over a first communication channel; and
  receive, from the mobile device, a payment request comprising the second identifier;
  an identifier associator arranged to, in response to receipt of the identifier notification transmitted from the mobile device over the second communication channel, associate the second identifier of the identifier notification with the first identifier of the identifier notification in a memory; and
  a payment notification generator arranged to, in response to receipt of the payment request transmitted from the mobile device, generate a payment notification in respect of the payment request, for transmission to the payee device corresponding to the first identifier associated with the second identifier.

The invention also provides a payee device for enabling a payment between a payor using a mobile device and a payee using the payee device, comprising:
  a communication interface arranged to:
  transmit a first identifier corresponding to the payee device, the first identifier being output by the communication interface for broadcast over a first communication channel to the mobile device, the first identifier broadcast to the mobile device being for transmission over a second communication channel to a payment processor with a second identifier corresponding to the mobile device, the first identifier transmitted to the payment processor being for association with the second identifier transmitted with the first identifier in a memory of the payment processor; and
  receive, from the payment processor, a payment notification (i) in respect of a payment request previously transmitted from the mobile device to the payment processor and comprising the second identifier, and (ii) transmitted from the payment processor to the payee device based on the second identifier of the payment request and the association of the second identifier with the first identifier; and
  a payment information generator arranged to, in response to receipt of the payment notification transmitted from the payment processor, generate payment information in respect of the payment request, for transmission to the payment processor.

The invention also provides a method of identifying one of a plurality of service providers using respective identifier transmitters, comprising:
  monitoring a first communication channel for receipt of a broadcast of a first identifier corresponding to one of the plurality of identifier transmitters;
  upon receipt of the first identifier, generating an identifier notification comprising the first identifier and a second identifier corresponding to a mobile device, and transmitting the identifier notification over a second communication channel to a transmitter identifying device;
  in response to receipt of the identifier notification at the transmitter identifying device, associating the second identifier of the identifier notification with the first identifier of the identifier notification in a memory;
  receiving from a querying device an identifier request comprising the second identifier; and
  in response to receipt of the identifier request, generating a transmitter notification based on the first identifier associated with the second identifier in the memory, and transmitting the transmitter notification to the querying device.

In an embodiment, the identifier request is transmitted from the mobile device to the transmitter identifying device over the second communication channel.

In an embodiment, the transmitter notification comprises the first identifier associated with the second identifier in the memory.

In an embodiment, the method further comprises determining the location of the identifier transmitter corresponding to the first identifier associated with the second identifier in the memory, and the transmitter notification comprises data indicative of the determined location.

In an embodiment, the first identifier is an identifier of and broadcast by the identifier transmitter corresponding to the first identifier.

In an embodiment, the second identifier is an identifier of the mobile device.

In an embodiment, the second identifier is an identifier of a user of the mobile device.

In an embodiment, the identifier notification is generated and transmitted by the mobile device.

In an embodiment, the querying device is the mobile device.

In an embodiment, the method further comprises, in response to receipt of the transmitter notification at the querying device, controlling the querying device to display the identifier transmitter corresponding to the first identifier.

In an embodiment, the identifier transmitter corresponding to the first identifier is displayed by an application implemented on or by the querying device.

In an embodiment, the method further comprises controlling the mobile device to display a second identifier request, in response to receipt from the first identifier transmitter of the broadcast of the first identifier.

In an embodiment, the second identifier request comprises identifier transmitter information relating to the identifier transmitter corresponding to the first identifier.

In an embodiment, the broadcast of the first identifier comprises a broadcast identifier, and the method further comprises determining that the broadcast identifier corresponds to a designated broadcast identifier.

In an embodiment, the broadcast identifier is a universally unique identifier (UUID) and the designated broadcast identifier is a designated UUID.

In an embodiment, the method further comprises receiving a first user input to generate and transmit the identifier notification, and the identifier notification is generated and transmitted from the mobile device to the transmitter identifying device in response to receipt of the first user input.

In an embodiment, the method further comprises receiving a second user input to generate and transmit the identifier request (in particular, subsequent to the second identifier of the identifier notification being associated with the first identifier of the identifier notification in the memory), and the identifier request is generated and transmitted from the querying device to the transmitter identifying device in response to receipt of the second user input.

In an embodiment, the first communication channel is a short-range communication channel.

In an embodiment, the first communication channel is a Bluetooth Low Energy communication channel.

In an embodiment, the first communication channel has a communication range of at least 1 meter.

In an embodiment, the first communication channel has a maximum communication range of about 100 meters.

In an embodiment, the first communication channel is a maximum data rate of about 1 megabits-per-second.

In an embodiment, the first communication channel has peak current consumption of at most 15 milliamperes.

In an embodiment, the first communication channel and the second communication channel are different communication channels.

In an embodiment, the second communication channel is a mobile cellular communication channel.

In an embodiment, the second communication channel is a wireless local area network communication channel.

In an embodiment, the identifier transmitters are located in different locations.

In an embodiment, the mobile device is a smartphone.

The invention also provides a system for identifying one of a plurality of service providers, comprising:
a plurality of identifier transmitters for respective use by the service providers, each identifier transmitter arranged to broadcast a first identifier over a first communication channel;
a mobile device arranged to:
monitor the first communication channel for receipt of a broadcast of the first identifier corresponding to one of the plurality of identifier transmitters; and
upon receipt of the first identifier, generate an identifier notification comprising the first identifier and a second identifier corresponding to the mobile device, and transmit the identifier notification over a second communication channel;
a transmitter identifying device arranged to:
receive the identifier notification transmitted from the mobile device over the second communication channel;
associate the second identifier of the identifier notification with the first identifier of the identifier notification in a memory;
receive from the querying device an identifier request comprising the second identifier;
generate a transmitter notification based on the first identifier associated with the second identifier in the memory, and transmit the transmitter notification to the querying device.

In an embodiment, the querying device is the mobile device.

In an embodiment, the transmitter notification comprises the first identifier associated with the second identifier in the memory.

In an embodiment, the transmitter identifying device is arranged to determine the location of the identifier transmitter corresponding to the first identifier associated with the second identifier in the memory, and the transmitter notification comprises data indicative of the determined location.

In an embodiment, the first identifier is an identifier of and broadcast by the identifier transmitter corresponding to the first identifier.

In an embodiment, the second identifier is an identifier of the mobile device.

In an embodiment, the second identifier is an identifier of a user of the mobile device.

In an embodiment, the mobile device is arranged to generate and transmit the identifier notification.

In an embodiment, the querying device is arranged to, in response to receipt of the transmitter notification, display the identifier transmitter corresponding to the first identifier.

In an embodiment, the identifier transmitter corresponding to the first identifier is displayed by an application implemented on or by the querying device.

In an embodiment, the mobile device is arranged to display a second identifier request, in response to receipt from the first identifier transmitter of the broadcast of the first identifier.

In an embodiment, the second identifier request comprises identifier transmitter information relating to the identifier transmitter corresponding to the first identifier.

In an embodiment, the broadcast of the first identifier comprises a broadcast identifier, and the mobile device is arranged to determine that the broadcast identifier corresponds to a designated broadcast identifier.

In an embodiment, the broadcast identifier is a universally unique identifier (UUID) and the designated broadcast identifier is a designated UUID.

In an embodiment, the mobile device is arranged to receive a first user input to generate and transmit the identifier notification, and the identifier notification is generated and transmitted from the mobile device to the transmitter identifying device in response to receipt of the first user input.

In an embodiment, the querying device is arranged to receive a second user input to generate and transmit the identifier request, and the identifier request is generated and transmitted from the querying device to the transmitter identifying device in response to receipt of the second user input.

In an embodiment, the first communication channel is a short-range communication channel.

In an embodiment, the first communication channel is a Bluetooth Low Energy communication channel.

In an embodiment, the first communication channel has a communication range of at least 1 meter.

In an embodiment, the first communication channel has a maximum communication range of about 100 meters.

In an embodiment, the first communication channel is a maximum data rate of about 1 megabits-per-second.

In an embodiment, the first communication channel has peak current consumption of at most 15 milliamperes.

In an embodiment, the first communication channel and the second communication channel are different communication channels.

In an embodiment, the second communication channel is a mobile cellular communication channel.

In an embodiment, the second communication channel is a wireless local area network communication channel.

In an embodiment, the identifier transmitters are located in different locations.

In an embodiment, the mobile device is a smartphone.

The invention also provides a transmitter identifying device for identifying one of a plurality of service providers using respective identifier transmitters, comprising:
a communication interface arranged to:

receive, from a mobile device over a second communication channel, an identifier notification comprising a first identifier corresponding to one of the plurality of identifier transmitters and a second identifier corresponding to the mobile device, the first identifier being previously broadcast to the mobile device over a first communication channel; and receive, from a querying device, an identifier request comprising the second identifier;

an identifier associator arranged to, in response to receipt of the identifier notification transmitted from the mobile device over the second communication channel, associate the second identifier of the identifier notification with the first identifier of the identifier notification in a memory; and a transmitter notification generator arranged to, in response to receipt of the identifier request transmitted from the querying device, generate a transmitter notification based on the first identifier associated with the second identifier in the memory, for transmission to the querying device.

The invention also provides a mobile device for identifying one of a plurality of service providers using respective identifier transmitters, comprising:

a communication interface arranged to monitor a first communication channel for receipt of a broadcast of a first identifier corresponding to one of the plurality of identifier transmitters;

an identifier notification generator arranged to, upon receipt of the first identifier, generate an identifier notification comprising the first identifier and a second identifier corresponding to a mobile device, and control the communication interface to transmit the identifier notification over a second communication channel to a transmitter identifying device, the first identifier transmitted to the transmitter identifying device being for association with the second identifier transmitted with the first identifier in a memory of the transmitter identifying device; and an identifier request generator arranged to generate an identifier request comprising the second identifier, and control the communication interface to receive a transmitter notification generated based on the first identifier associated with the second identifier in the memory.

BRIEF DESCRIPTION OF THE DRAWINGS

In order that the invention may be more clearly ascertained, embodiments will now be described, by way of example, with reference to the accompanying drawings, in which.

DETAILED DESCRIPTION

Figure 4:
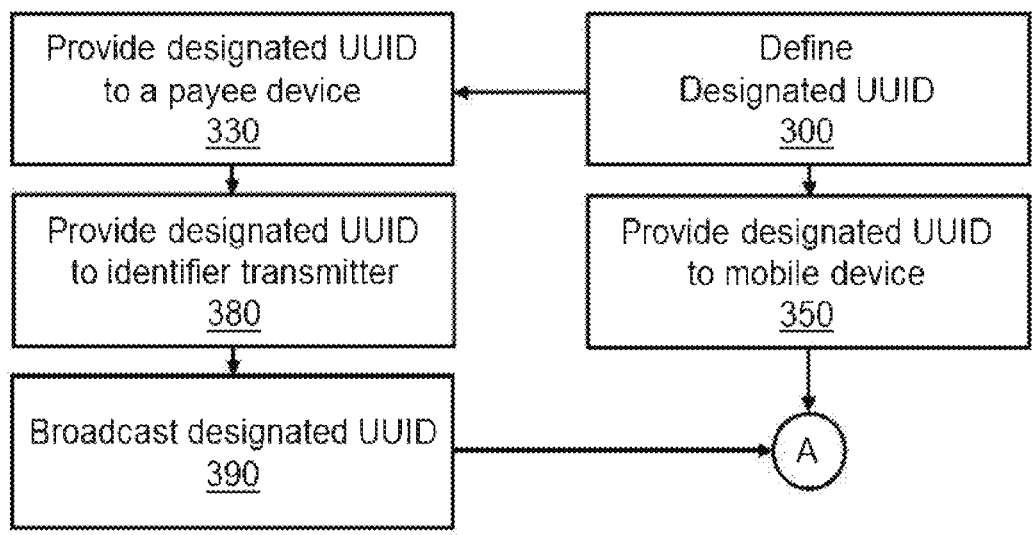
FIG. 4 is a flow chart of additional steps that may optionally precede the method of FIG. 3.
Figure 5:
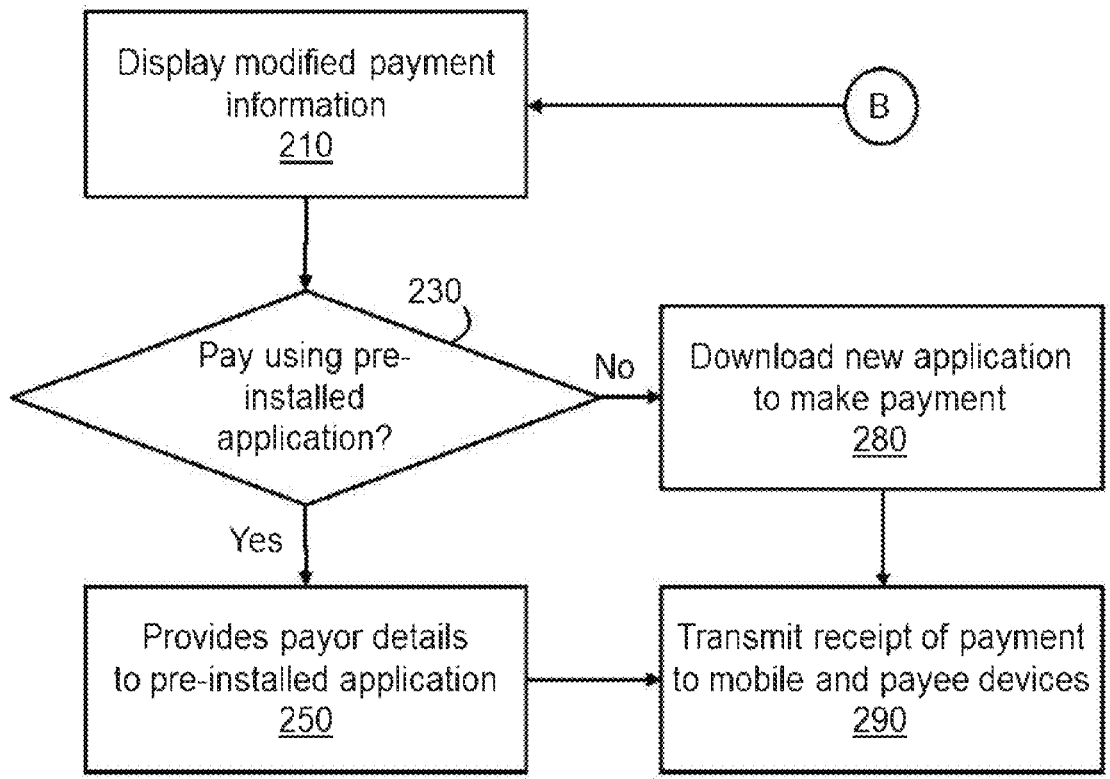
FIG. 5 is a flow chart of additional steps that may optionally follow the method of FIG. 3.
Figure 6:
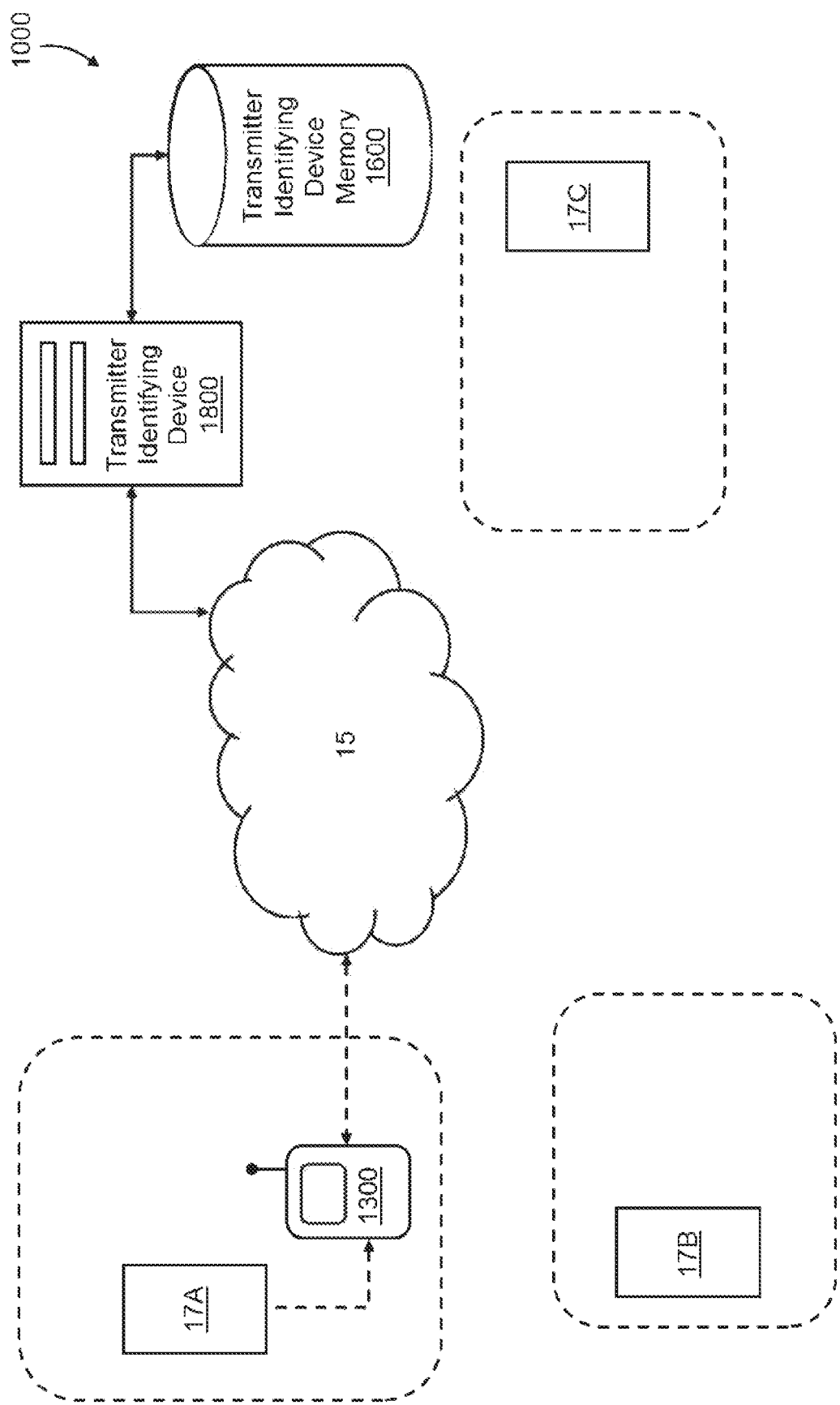
FIG. 6 is a schematic diagram of the physical architecture of an embodiment of the system for identifying one of a plurality of identifier transmitters.
Figure 7:
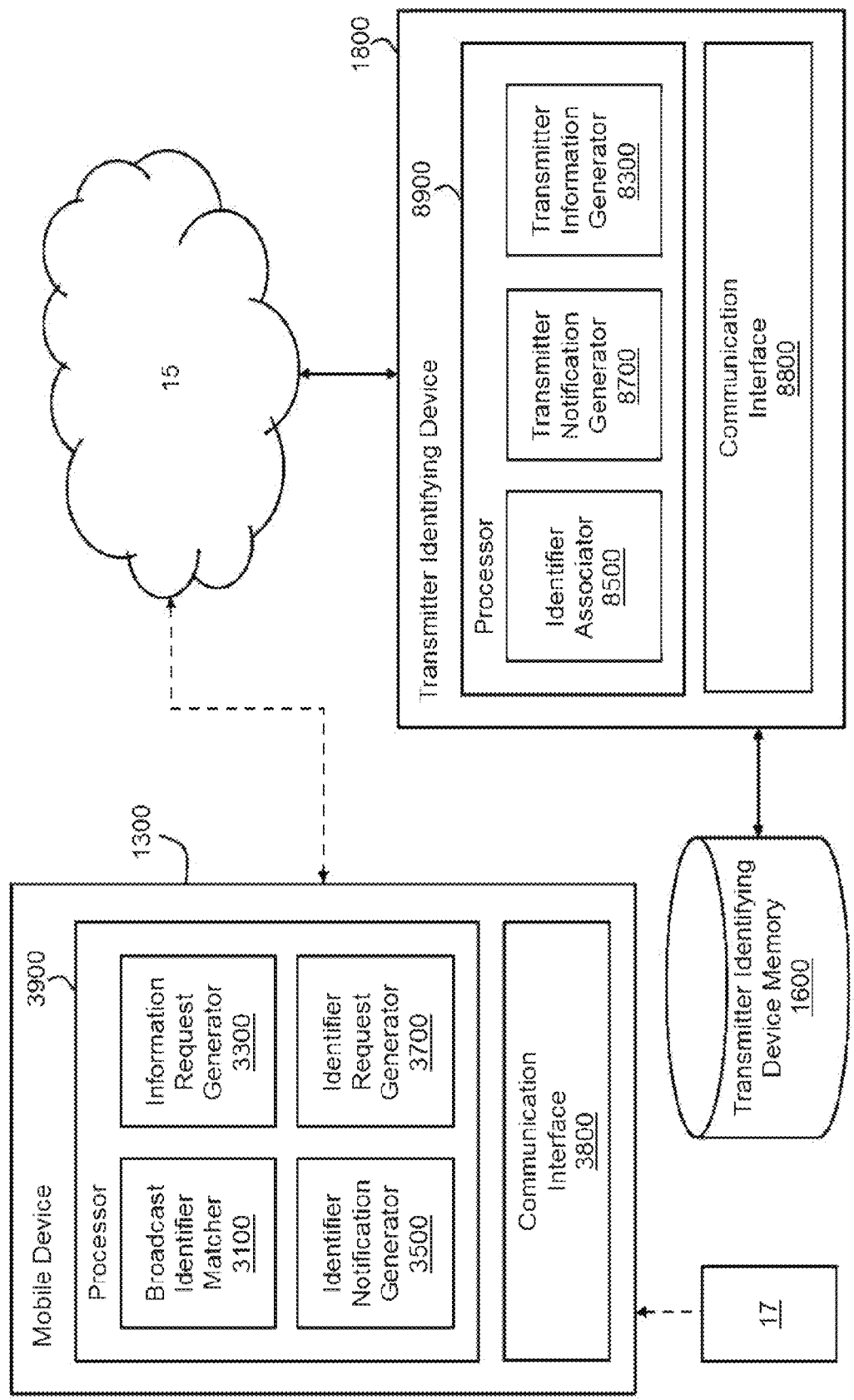
FIG. 7 is a schematic diagram of the functional components of the system of FIG. 6.
Figure 8:
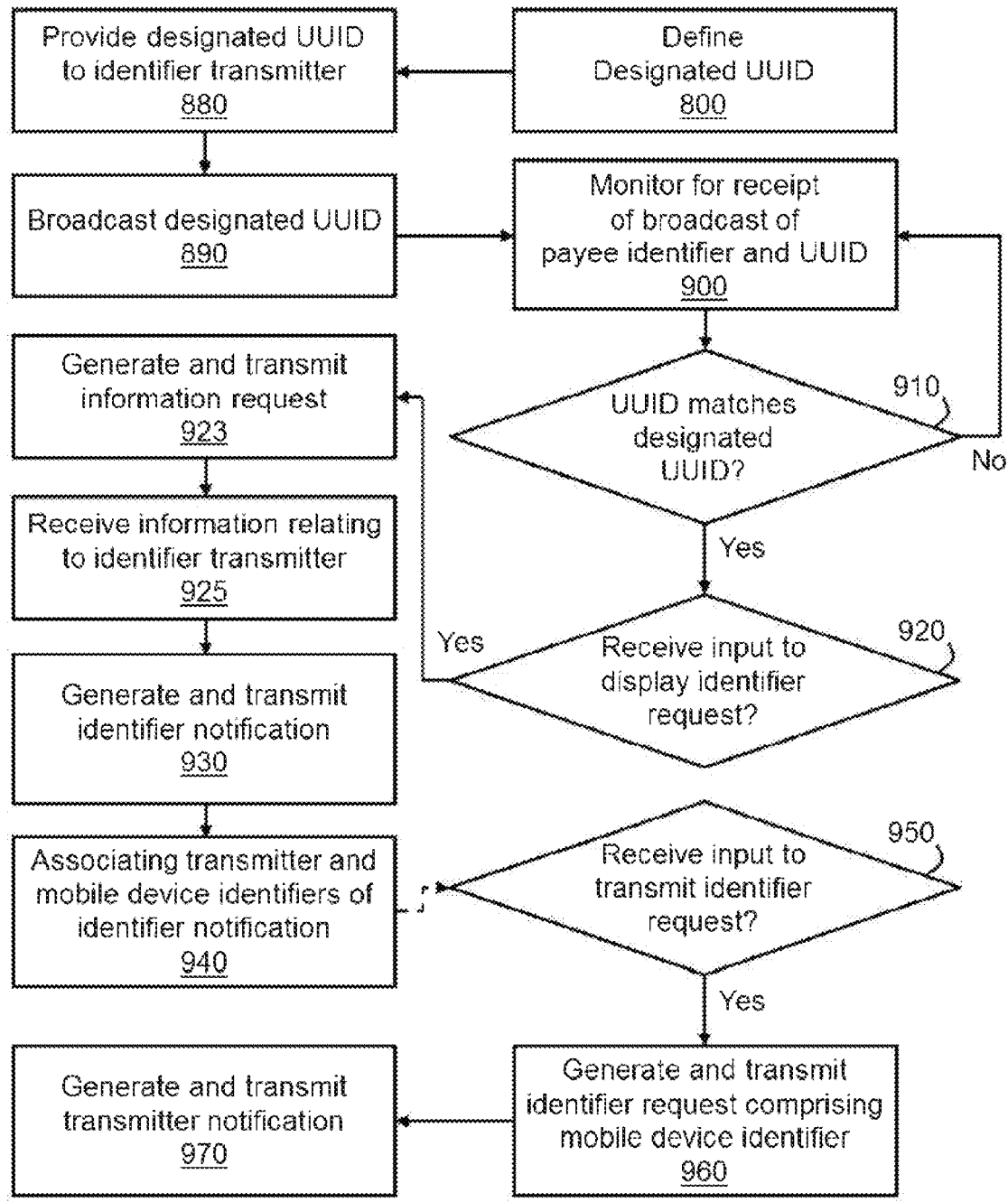
FIG. 8 is a flow chart of an embodiment of the method of identifying one of a plurality of identifier transmitters, carried out using the system of FIGS. 1 and 2.

Referring to FIGS. 1 to 8 of the drawings, there is shown a system 10, 1000 comprising a plurality of identifier transmitters 17 and a mobile device 13, 1300. As described in further detail below, the system 10, 1000 is arranged to associate an identifier corresponding to the mobile device 13, 1300. For example, in an embodiment of the system 10 as illustrated in FIGS. 1 to 5, the system 10 is arranged to associate an identifier corresponding to one of a plurality of payee devices 19 in communication with respective ones of the identifier transmitters 17 with an identifier corresponding to the mobile device 13 in order to enable a payment between a payor using the mobile device and one or more of a plurality of payees corresponding to respective ones of the identifier transmitters 17. In another example, an alternative embodiment of the system 1000 as illustrated in FIGS. 6 to 8 is arranged to associate an identifier corresponding to one of the identifier transmitters 17 with an identifier corresponding to the mobile device 1300 in order to enable an identification of one of a plurality of service providers corresponding to respective ones of the identifier transmitters 17. It is envisaged the features from an embodiment of the system 10, 1000 may be incorporated into another embodiment of the system 10, 1000. For example, in the alternative embodiment of the system 1000 illustrated in FIGS. 6 to 8, the system 1000 may alternatively be arranged to associate an identifier corresponding to one of a plurality of intermediaries (such as the payee devices 19 of the embodiment of the system 10 illustrated in FIGS. 1 to 5) in communication with respective ones of the identifier transmitters 17 (rather than an identifier corresponding to one of the identifier transmitters 17) with an identifier corresponding to the mobile device 1300 in order to enable an identification of one of a plurality of service providers corresponding to respective ones of the identifier transmitters 17.

Turning now to FIGS. 1 to 5 of the drawings, there is shown embodiment of a system 10 for enabling a payment between a payor (a passenger of a taxi) using a mobile device 13 (such as smartphone in the form of an iPhone (trademark) developed by Apple Inc.) and one or more payees (in particular, taxi drivers) using respective payee devices 19. The system 10 comprises a payment processor 18 in communication with the mobile device 13. The payment processor 18 is configured to, upon receipt from the mobile device 13 of a first identifier (such as a driver identifier (ID)) corresponding to one of the payee devices 19 and a second identifier (such as a media access control (MAC) address or Device ID of an iPhone) corresponding to the mobile device 13, associate the first identifier with the second identifier in a memory 16. The payment processor 18 is also configured to, in response to receipt of a payment request transmitted from the mobile device 13, generate a payment notification in respect of the payment request, and transmit the payment notification to the payee device 19 corresponding to the first identifier associated with the second identifier in the memory 16. Advantageously, the system 10 facilitates an automatic payment from the payor using the mobile device 13 to one of the payees using any of the payee devices 19, once the first identifier is associated with the second identifier. Another advantage is that payment may be made by the payor to a payee without requiring a direct connection between the mobile device 13 and the payee device 19 to be established. A further advantage is that the system 10 allows an offer, coupon or discount or some other benefit to be managed and applied to any payment by the payment processor 18 at a central location (rather than by payee devices 19 at distributed locations).

It is envisaged that the payment processor 18 is typically implemented by a computing device such as a computer server (which may be located remotely or via "cloud computing"), a desktop personal computer, a portable computer (such as a laptop computer, a notebook computer or a tablet computer), or a mobile computing device (such as a smartphone), a programmable circuit etc. Persons skilled in the art will appreciate that the payment processor 18 may be implemented by multiple computing devices such that each computing device implements only a part or parts of the payment processor 18.

Figure 1:
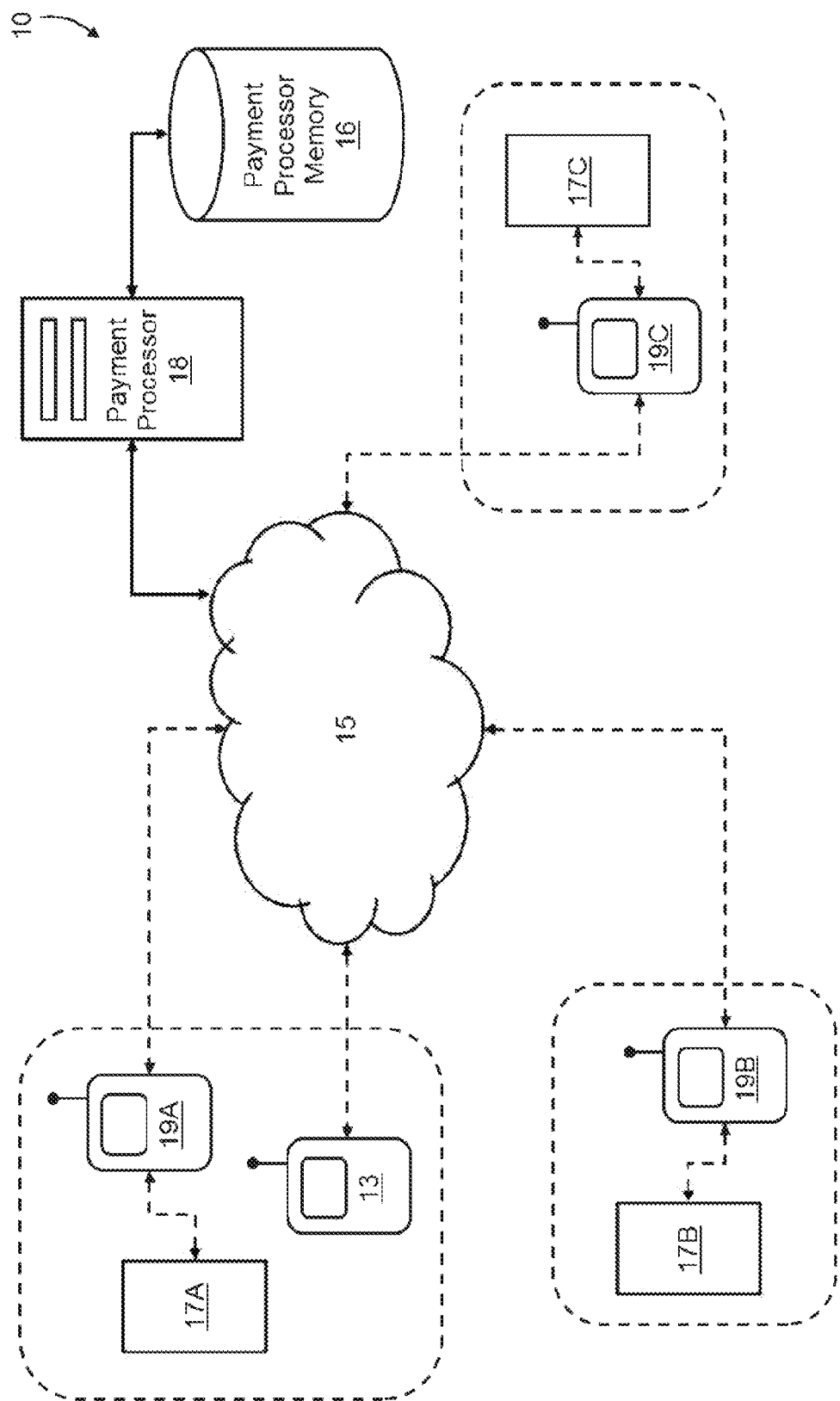
FIG. 1 is a schematic diagram of the physical architecture of an embodiment of the system for enabling a payment between a payor using a mobile device and one of a plurality of payees using respective payee devices.

FIG. 1 is a schematic diagram of the physical architecture of an embodiment of the system 10. The system 10 comprises a payment processor 18 connected to a payment processor memory 16 and a network 15 in the form of the Internet. The system 10 also comprises a plurality of payee devices 19 for use by respective payees, each of the payee devices 19 being in wireless communication with a respective one of a plurality of identifier transmitters 17. In this embodiment, the system 10 takes advantage of the iBeacon (trademark) arrangement and the Passbook application developed by Apple Inc. Thus, each of the payee devices 19 is a smartphone in the form of an iPhone (trademark) located in a taxi, and each of the identifier transmitters 17 is an iBeacon that is adapted to broadcast notifications using a short range communication standard such as Bluetooth Low Energy (BLE) or Bluetooth Smart (trademark). The use of BLE or Bluetooth Smart is advantageous in that it has a range that is suitable for broadcasting signals within a taxi, a maximum data rate that is high enough for broadcasting iBeacon signals (about 1 megabits-per-second), and relatively low peak current consumption (about 15 milliamperes). The system 10 also comprises a mobile device 13 for use by the payor to receive the notifications broadcast from the identifier transmitters 17, In this embodiment, the mobile device 13 like each of the payee devices 19—is a smartphone in the form of an iPhone. The mobile device 13 and each of the payee devices 19 can be in wireless communication with the network 10 via a mobile communication network such as a Long Term Evolution (LTE) network or alternatively a wireless local area network such as Wi-Fi.

In this embodiment of the system 10, the payee devices 19, the identifier transmitters 17 and the mobile device 13 are devices that are compatible with the Passbook (trademark) application by Apple Inc. However, it is envisaged that the system 10 may alternatively or additionally comprise devices that are not compatible with the Passbook (trademark) application by Apple Inc. but are compatible with equivalent products such as Google Wallet (trademark). For example, it is envisaged that an alternative embodiment of the system 10 may comprise payee devices 19 in the form of smartphones where each identifier transmitter 17 is integrated within a smartphone (rather than in a separate device such as an iBeacon), for example, by an application (in particular, a proprietary application supplied or provided by a service provider such as a Payment Service Provider (PSP) or a taxi company) installed on the smartphone.

It is envisaged that an alternative embodiment of the system 10 may comprise more than one mobile device 13. Also, the system 10 may comprise one or more payee devices 19. Also, it is envisaged that an alternative embodiment of the system 10 may take advantage of an arrangement other than the iBeacon arrangement, or an application (such as a proprietary application provided or supplied by a service provider such as a PSP or a taxi company) in addition to or other than the Passbook application. In this respect, the notifications from the identifier transmitters 17 may not be broadcast using BLE or Bluetooth Smart as specified by the iBeacon arrangement, but using other short range communication standards such as Near Field Communication (NFC) as specified by an alternative arrangement. In this respect, a person skilled in the art will appreciate that any alternative communication standard having a suitable range (for example, one having a range of at least 1 meter, or one having a maximum of about 100 meters) to broadcast the notifications within a taxi to a passenger of the taxi may be used. Examples of such alternative communication standards include wireless local area network (Wi-Fi) standards, and mobile or cellular communication standards such as LTE or UMTS. It is also envisaged that other communication methods such as barcodes, for example, Quick Response (QR) codes may be used in other embodiments.

Persons skilled in the art will appreciate that the payment processor memory 16 may be implemented in a single device (for example, as part of the payment processor 18) or in separate devices.

Figure 2:
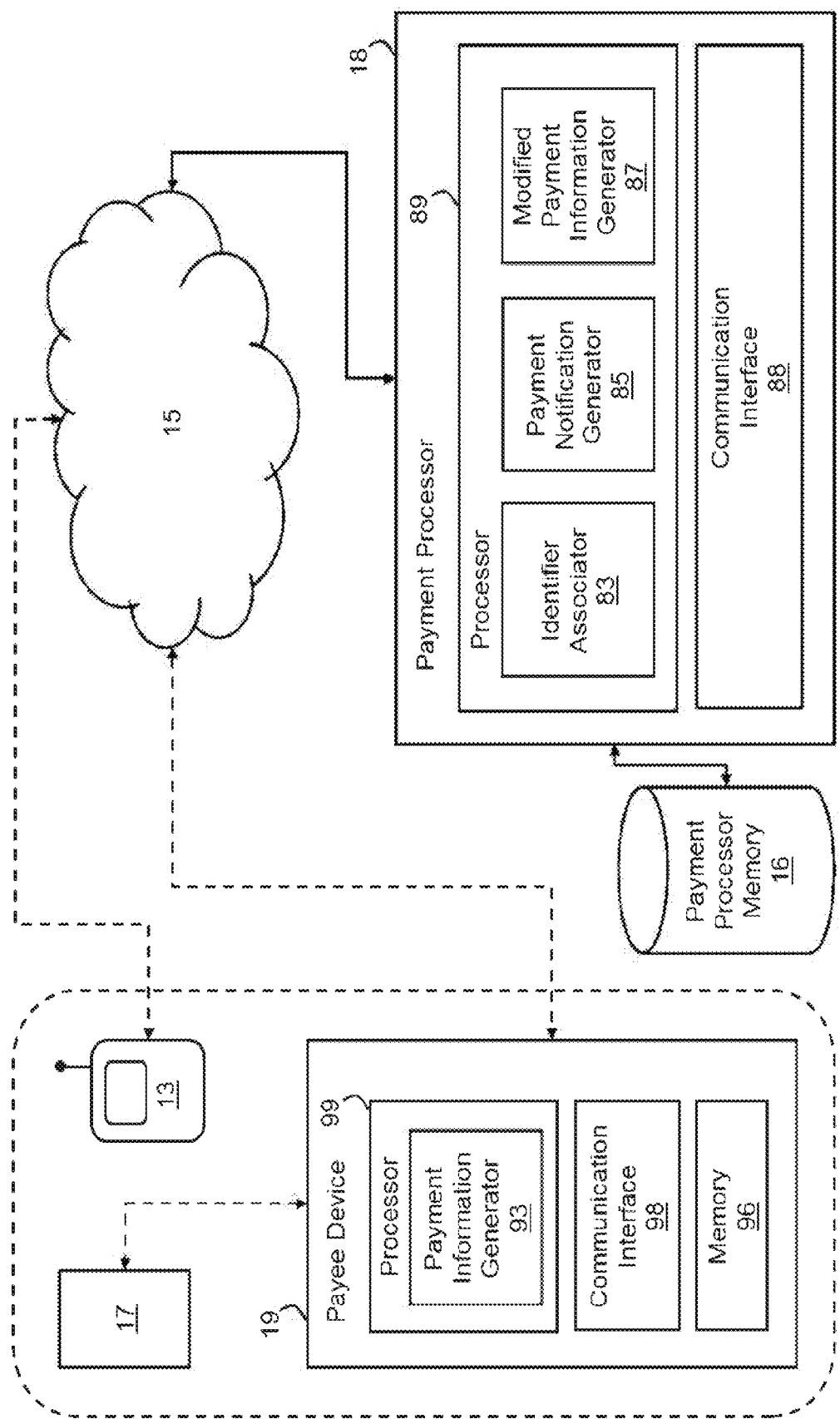
FIG. 2 is a schematic diagram of the functional components of the system of FIG. 1.

The system 10 comprises a number of functional components for enabling a payment between a payor using the mobile device 13 and each of the payees using respective payee devices 19. It is envisaged that the functional components are typically implemented by a processor of a device executing program code and data stored in a memory of the device. However, persons skilled in the art will appreciate that this need not be the case. For example, one or more of the components could be implemented in an alternative manner, for example, as a dedicated circuit. FIG. 2 is a schematic diagram showing the functional components of the system 10. In FIG. 2, only one of the identifier transmitters 17 and only one of the payee devices 19 are shown.

Beginning first with the payment processor 18 of the system 10, the payment processor 18 comprises a processor 89 and a communication interface 88. The processor 89 of the payment processor 18 is arranged to implement functional components in the form of an identifier associator 83, a payment notification generator 85, and a modified payment information generator 87 based on program code and data stored in the payment processor memory 16 connected to the payment processor 18.

As indicated above, the identifier transmitter 17 is adapted to broadcast notifications using BLE or Bluetooth Smart as specified according to the iBeacon arrangement. In particular, the identifier transmitter 17 is arranged to broadcast an identifier (a payee device identifier) of the payee device 19 over a BLE or Bluetooth Smart communication channel. It is envisaged that the identifier transmitter 17 may alternatively broadcast an identifier of a payee, or any identifier corresponding to either a payee device 19 or a payee.

In use, the payee device identifier is provided to the identifier transmitter before the payee device identifier is broadcast by the identifier transmitter 17. It is envisaged that the payee device identifier may be provided to the identifier transmitter 17 in different ways. For example, the payee device identifier may be output by a communication interface 98 of the payee device 19 (or some other device such as another smartphone) to the identifier transmitter 17 using BLE or Bluetooth Smart. In another example, the payee device identifier may be provided to the identifier transmitter 17 by connecting the identifier transmitter 17 to a computer (for example, a desktop computer or a laptop computer) via a Universal Serial Bus (USB), and outputting the payee device identifier from the computer to the identifier transmitter 17 via the USB connection. More details will be provided below with reference to FIGS. 3 to 5 (for example, with reference to item 380 of FIG. 4).

The mobile device 13 is adapted to monitor the BLE or Bluetooth Smart communication channel for receipt of a broadcast of a payee device identifier. As indicated above, the mobile device 13 is an iPhone in this embodiment. An application in the form of the Passbook application by Apple Inc. is installed in the mobile device 13. In use, the Passbook application monitors the BLE or Bluetooth Smart communication channel for receipt of a broadcast signal that includes a broadcast identifier in the form of a universally unique identifier (UUID), and a payee device identifier in the form of an identifier of a driver of a taxi (a driver ID), an identifier of the so taxi (a vehicle ID), or both the driver ID and the vehicle ID.

For example, the broadcast signal may include:
Name: Payment Service Provider (PSP) name
UUID: Designated UUID
Major value: Driver ID
Minor value: Vehicle ID In the above example of the broadcast signal, the Major and Minor values represent settings of an iBeacon that are configurable by a service provider (such as the PSP) to differentiate iBeacons in different taxis.

Upon receipt by the mobile device 13 of the broadcast signal, the mobile device 13 determines whether the broadcast identifier (that is, the UUID) of the broadcast signal matches or corresponds to a designated broadcast identifier (that is, a designated UUID). In response to a determination that the UUID of the broadcast signal corresponds to a designated UUID, the mobile device 13 displays an identifier request in the form of a notification to display information relating to the driver of the taxi and/or the taxi (that is, the taxi driver and/or taxi corresponding to the payee device identifier of the broadcast signal transmitted by the identifier transmitter 17), When the mobile device 13 receives from the payor (that is, the passenger) a payor input to display the information relating to the driver of the taxi and/or the taxi, the mobile device 13 generates an identifier notification comprising the payee device identifier and an identifier (a payor identifier) corresponding to either the mobile device 13 or the payor such as an identifier of the payor or an identifier of the mobile device 13 (such as a media access control (MAC) address or device ID of the mobile device 13), and transmits the identifier notification over a communication channel through the LTE network and the Internet 15 to the payment processor 18. Then, the mobile device 13 generates and displays to the payor the information relating to the driver of the taxi and/or the taxi via the Passbook app (or alternatively via an equivalent app such as Google Wallet, a proprietary application provided or supplied by a service provider such as a PSP or a taxi company, or a web browser app in alternative embodiments). It is envisaged that the information relating to the driver of the taxi and/or the taxi may be generated by the mobile device 13 in different ways. For example, the information may be generated by retrieving the information from the payment processor 18. In another example, the information may be generated by retrieving the information from a memory of the mobile device 13.

In this embodiment, the information relating to the driver of the taxi displayed via the Passbook app on the mobile device 13 includes information relating to making a payment via the payment processor 18, The information relating to making a payment via the payment processor 18 includes an offer, coupon or discount for payments made via the payment processor 18. However, it is envisaged that, in an alternative embodiment of the system 10, the information relating to making a payment via the payment processor 18 may not include such an offer, coupon or discount. Depending on the embodiment, the information relating to making a payment may be in the form of a uniform resource locator (URL) displayed either via the Passbook app (or alternatively via an equivalent app such as Google Wallet, a proprietary application provided or supplied by a service provider such as a PSP or a taxi company, or a web browser application implemented by the mobile device 13). When the mobile device 13 receives from the payor a payor input to display the information relating to making a payment, the mobile device 13 takes that payor input as an input to generate and transmit a payment request, and generates a payment request comprising the payor identifier. Then, the mobile device 13 transmits the payment request over a communication channel through the LTE network and the Internet 15 to the payment processor 18. In this embodiment, the payment request includes information relating to the offer, coupon or discount for payments made via the payment processor 18. Depending on the embodiment, the payment request and the identifier notification may be transmitted over the same communication channel through the LTE network and the Internet 15 connecting the mobile device 13 to the payment processor 18, or over different communication channels, through different network or networks, or over different communication channels and through different network or networks. For example, either the payment request or the identifier notification may alternatively be transmitted through a wireless local area network (rather than the LTE network) and the Internet 15.

The communication interface 88 of the payment processor 18 is adapted to receive the identifier notification transmitted from the mobile device 13, and the payment request transmitted from the mobile device 13. The identifier associator 83 is arranged to, in response to receipt by the communication interface 88 of the identifier notification transmitted from the mobile device 13, associate the payee identifier of the identifier notification with the payor identifier of the identifier notification in the payment processor memory 16 connected to the payment processor 18. The payment notification generator 85 is adapted to, in response to receipt by the communication interface 88 of the payment request transmitted from the mobile device 13, generate a payment notification in respect of the payment request, and transmit the payment notification to the payee device 19 corresponding to the payee identifier associated with the payor identifier in the payment processor memory 16 connected to the payment processor 18.

Turning now to the functional components of the payee device 19 of the system 10, the payee device 19 comprises a processor 99, a communication interface 98 and a memory 96. The processor 99 of the payee device 19 is arranged to implement a functional component in the form of a payment information generator 93 based on program code and data stored in the memory 96 of the payee device 19.

The communication interface 98 of the payee device 19 is adapted to receive the payment notification transmitted from the payment processor 18. The payment information generator 93 is arranged to generate payment information in respect of the payment request, and transmit the payment information over a communication channel through the LTE network and the Internet 15 to the payment processor 18.

In use, the payee device 19 displays to the payee (that is, the taxi driver) a request to make a payee input, in response to receipt by the communication interface 98 of the payee device 19 of the payment notification transmitted from the payment processor 18. As indicated above, the payee device 19 is a smartphone in the form of an iPhone. In this embodiment, the request to make a payee input is a request to input the fare for a trip (that is, the charge or the cost of the trip) displayed by an application installed on the iPhone 19. Upon receipt of the payee input, the payment information generator 93 of the payee device 19 generates payment information in respect of the payment request based on the payee input. Then, the payment information generator 93 transmits the generated payment information over a communication channel through the LTE network and the Internet 15 to the payment processor 18.

The communication interface 88 of the payment processor 18 is adapted to receive the payment information transmitted from the payee device 19. The modified payment information generator 87 of the payment processor 18 is adapted to, in response to receipt by the communication interface 88 of the payment processor 18 of the payment information transmitted from the payee device 19, generate modified payment information based on the payment information, and transmit the modified payment information to the mobile device 13. In this embodiment, the modified payment information is generated based on not only the payment information transmitted from the payee device 19, but also the information relating to the offer, coupon or discount for payments made via the payment processor 18. Thus, the modified payment information includes an offered, redeemable or discounted fare compared to the fare input by the payee (that is, the taxi driver). It is envisaged that the modified payment information is transmitted from the payment processor 18 over a communication channel through the Internet 15 and the LTE network connecting the payment processor 18 to the mobile device 13, but a person skilled in the art will appreciate that the modified payment information may be transmitted via an alternative network or networks. Also, it is envisaged that, in an alternative embodiment, the fare input by the payee may be modified into an offered, redeemable or discounted fare by a proprietary application provided or supplied by a service provider such as a PSP or a taxi company.

When the mobile device 13 receives the modified payment information from the payment processor 18, the mobile device 13 displays the modified payment information including the offered fare, redeemable fare or discounted fare. In this embodiment, the modified payment information is displayed on a webpage via a web browser application implemented by the mobile device 13. However, it is envisaged that the modified payment information may be alternatively displayed, for example, by another application implemented by the mobile device 13, for example, a proprietary application provided or supplied by a service provider such as a PSP or a taxi company, a payment application provided or supplied by a payment service provider (PSP), Google Wallet, a web browser app etc.

In this embodiment, modified payment information is generated by the payment processor 18 to apply any offer, coupon or discount, after payment information is received by the payment processor 18. However, it is envisaged that, in an alternative embodiment, an offer, coupon or discount may be applied before the modified payment information is generated by the payment processor 18. For example, in an alternative embodiment, the payment notification generated by the payment processor 18 may include information relating to an offer, coupon or discount such that the payee (that is, the taxi driver) may apply the offer, coupon or discount before payment information is generated and transmitted from the payee device 19 to the payment processor 18.

It is envisaged that payment information may be generated and transmitted from a payee device 19 to the payment processor 18 before commencement of a trip, during a trip or alter the completion of a trip.

It is envisaged that the broadcast signal by the identifier transmitter 17 may include information other than the broadcast identifier and the payee identifier. For example, the broadcast signal may include details about the driver of the taxi, the taxi itself, any affiliated organizations (such as the company providing or delivering the taxi or transportation service), related or unrelated advertisements, and an option to pay for a trip or the transportation service.

It is envisaged that an application or applications may be installed in the mobile device 13 used by the payor (that is, the passenger of the taxi) to provide the payor with an option or multiple options to make a payment in respect of a trip or transportation service. As indicated above, it is envisaged that the payee device 13 is notified if a payor takes up an option to make a payment in respect of a trip or transportation service using such an application or applications. In this respect, it is envisaged that such an option or options may include making a payment on a website via a web browser application, a proprietary application provided or supplied by a service provider such as a PSP or a taxi company, a payment application that may be previously installed on the mobile device. Also, it is envisaged that a payor may also decide to manually make a payment using cash or a point of sale payment device. It is also envisaged that a notification such as an email or short messaging service (SMS) message may be transmitted to the payor, the payee, or both the payor and the payee, upon approval or completion of a payment.

Also, it is envisaged that an application or applications may be installed in the payee device 19 used by the payee (that is, the driver of the taxi) to enable the payee to receive a payment in respect of a trip or transportation service. An example of such an application or applications is described below with reference to FIGS. 3 to 5.

Also, it is envisaged that the payment processor 18 may be additionally configured to complete any payment made by the payor using the mobile device 13. For example, a payment made by the payor using the mobile device 13 may be first received by a PSP operating the payment processor 18 before being forwarded to the payee (for example, a payee-specified bank account). In this respect, the payment processor 18 may be additionally or alternatively configured to deduct any fees before forwarding payment to the payee.

Figure 3:
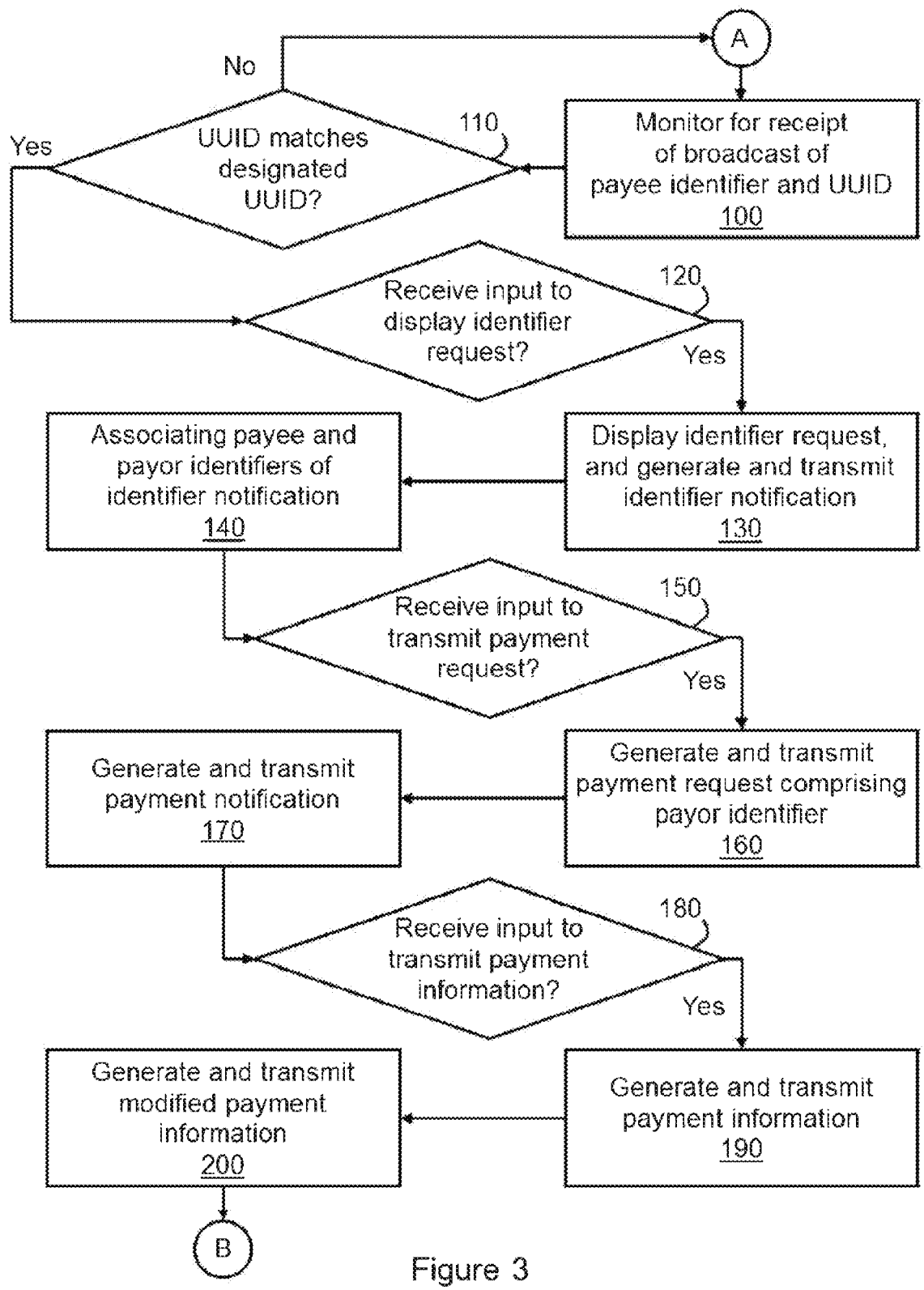
FIG. 3 is a flow chart of an embodiment of the method of enabling a payment, carried out using the system of FIGS. 1 and 2.

FIG. 3 is a flow chart of an embodiment of the method of enabling a payment, carried out using the system of FIGS. 1 and 2. As indicated in the figure, additional steps may precede or follow the steps illustrated in the figure. These additional steps are described in more detail below with reference to FIGS. 4 and 5.

At step 100, an application of the mobile device 13 (that is, the Passbook application installed in the iPhone of a passenger of a taxi, or alternatively a proprietary application provided or supplied by a service provider such as a PSP or a taxi company) monitors a communication channel in the form of a BLE or Bluetooth Smart communication channel for receipt of a broadcast signal from an identifier transmitter 17 (that is, an iBeacon), the broadcast signal comprising a broadcast identifier in the form of a UUID, and a payee device identifier in the form of a driver ID and a vehicle ID.

At step 110, the Passbook application (or alternatively the proprietary application mentioned at step 100) installed in the mobile device 13 determines whether or not the UUID of the broadcast signal matches or corresponds to a designated UUID. If the mobile device 13 determines that the UUID of the broadcast signal does not match or correspond to the designated UUID, the mobile device 13 monitors the communication channel for receipt of another broadcast signal. Otherwise, if the mobile device 13 determines that the UUID of the broadcast signal matches or corresponds to the designated UUID, the mobile device 13 displays an identifier request in the form of a notification (such as a pop-up window if the mobile device 13 is being used by the payee, or a notice on a lock screen displayed by the mobile device 13 if the mobile device 13 is not being used by the payee) to display information relating to a payee, for example, a notification to display via the Passbook application a pass comprising information relating to the driver of the taxi, or alternatively a notification to display the information relating to the driver of the taxi via the proprietary application mentioned at step 100. As indicated above, it is envisaged that the information relating to a payee may include other information including information relating to the taxi, an affiliated transportation company or PSP, an option to pay and/or redeem an offer and/or discount by making a payment via the payment processor 18 etc.

If the mobile device 13 does not receive an input to display the pass, the mobile device 13 continues to display the notification to display information relating to a payee, until the mobile device 13 no longer receives the broadcast signal from the identifier transmitter 17.

At step 120, the mobile device 13 receives an input from the payor (that is, the passenger in the taxi) using the mobile device 13 to display via the Passbook application (or alternatively, via the proprietary application mentioned at step 100) the pass comprising information relating to the driver of the taxi (that is, to display the identifier request).

At step 130, the mobile device 13 displays the identifier request, that is, displays via the Passbook application (or alternatively, via the proprietary application mentioned at step 100) the pass comprising information relating to the driver of the taxi including information relating to any discount for making a payment via the payment processor 18. In this embodiment, the information relating to a discount for making a payment via the payment processor 18 includes a proprietary app download or URL for initiating a payment via the payment processor 18. The mobile device 13 also generates an identifier notification comprising the payee device identifier (that is, the driver ID and the vehicle ID of the broadcast signal from the iBeacon 17) and a MAC address or device ID (a payor identifier) of the mobile device 13, and transmits the identifier notification over a communication channel through the LTE network and the Internet 15 to the payment processor 18.

At step 140, the payment processor 18 associates the MAC address or device ID (the payor identifier) of the identifier notification with the driver ID and the vehicle ID (that payee identifier) of the identifier notification in the payment processor memory 16 connected to the payment processor 18.

As indicated above, the identifier request displayed by the mobile device 13 via the Passbook application installed on the mobile device 13 includes a URL for initiating a payment which can be made, for example, via the payment processor 18 or some other payment processor. At step 150, the payor accesses the URL to initiate a payment, for example, by clicking the URL. As indicated above, it is envisaged that, in an alternative embodiment, the identifier request (that is, the information relating to the driver of the taxi) could alternatively be displayed via the proprietary application mentioned at step 100. In such an alternative embodiment, the proprietary application may be used by the payor to initiate the payment at step 150.

At step 160, a payment request comprising the payer identifier (that is, the MAC address or device ID of the mobile device or iPhone 13) is generated and transmitted from the mobile device 13 to the payment processor 18. In this embodiment, the payment request may include information relating to the discount for payments made via the payment processor 18.

At step 170, the payment processor 18 receives the payment request from the mobile device 13, and retrieves from the payment processor memory 16 the payee identifier associated with the received payor identifier (that is, the MAC address or device ID of the payment request received from the mobile device 13). Then, the payment processor 18 generates a payment notification in respect of the payment request, and transmits the payment notification to the payee device 19 corresponding to the associated payee identifier.

At step 180, in response to receipt by the communication interface 98 of the payee device 19 of the payment notification transmitted from the payment processor 18, the payee device 19 displays to the payee (that is, the taxi driver) a request to make a payee input, and an input to generate and transmit payment information is received by the payee device 19 when the payee inputs the fare for a trip. As indicated above, depending on the embodiment, the fare input by the payee may or may not take into account any offer, coupon or discount.

At step 190, the payee device 19 generates the payment information based on the fare input by the payee, and transmits the generated payment information to the payment processor 18.

At step 200, the payment processor 18 receives the payment information from the payee device 19, and generates modified payment information based on the received payment information and the information relating to any offer or discount for payments made via the payment processor 18 included in the payment request previously transmitted at step 160. Then, the payment processor 18 transmits the modified payment information to the mobile device 13.

As indicated in the FIG. 3, additional steps may optionally precede the steps illustrated in the FIG. 3. These optional preceding steps are described in more detail below with reference to FIG. 4.

At step 300, a designated UUID is defined for enabling a payment from a payor to a payee. At step 330, the payee device 19 used by the payee (that is, the driver of the taxi using the payee device 19) is provided or supplied with the designated UUID. In this embodiment, the designated UUID is provided to a payee device 19 when the taxi driver using the payee device 19 downloads a payment application provided by a PSP from an application store in the form of the iTunes (trademark), installs the payment application on the payee device, and creates an account with the PSP and provides bank account details to receive payments from the PSP. Persons skilled in the art will appreciate that creating and installing the payment application may involve steps such as entering and authenticating payee details such as the bank details of the payee.

At step 350, the mobile device 13 used by the payor is provided or supplied with a pass compatible with the Passbook application implemented on the mobile device 13. As indicated above, the pass corresponds to an offer or coupon that may be from an affiliated transportation company, a PSP etc. It is envisaged that the pass may be provided to the mobile device 13 via different ways including email, social media, SMS. Bluetooth, Ethernet, Wi-Fi, QR codes etc. As indicated above, the pass remains dormant (but active) in the mobile device 13 until the mobile device 13 receives a broadcast signal corresponding to a designated broadcast identifier such as a designated UUID. As indicated above, the mobile device 13 may, in an alternative embodiment, receive an equivalent of the pass that is compatible with an alternative to the Passbook application supplied by an affiliated transportation company, a payment service provided (PSP) etc.

At step 380, the designated UUID is provided to identifier transmitter 17 in communication with the payee device 19. The identifier transmitter 17 is a standalone device (specifically, an iBeacon) in this embodiment. However, as indicated above, it is envisaged that the identifier transmitter 17 may not be a standalone device. In particular, the identifier transmitter 17 may be the payee device 19 (or a part of the payee device 19) as indicated above.

At step 390, a broadcast signal comprising a broadcast identifier in the form of a UUID and a payee identifier (such as a Driver ID or a vehicle ID) is broadcast by the identifier transmitter 17. As indicated above, the identifier transmitter is an iBeacon, and the broadcast signal is broadcast using a BLE or Bluetooth Smart communication channel. Below is an example of details included in the broadcast signal:

Name: PSP name
UUID: Designated UUID
Major value: Driver ID
Minor value: Vehicle ID As indicated above, it is envisaged that the identifier transmitter may not be an iBeacon, and the broadcast signal may alternatively or additionally be broadcast using other communication channels such as a Wi-Fi communication channel. Also, depending on the embodiment, the payee identifier and the broadcast identifier may be broadcast separately from different devices. For example, the broadcast identifier (that is, the UUID) may be broadcast by the identifier transmitter 17 and the payee identifier (that is, the Driver ID and/or the vehicle ID) may be broadcast by the payee device 19.

As indicated in the FIG. 3, additional steps may optionally follow the steps illustrated in the FIG. 3. These optional following steps are described in more detail below with reference to FIG. 5.

At step 210, the mobile device 13 displays a discounted fare based on the modified payment information transmitted from the payment processor 18 to the mobile device 13 at step 200 of FIG. 3. In this embodiment, the payor can accept the discounted fare (that is, accept to pay the discounted fare for the trip), for example, by pressing an on screen button, a swiping action etc. As indicated above, it is envisaged that, in an alternative embodiment, modification of payment information may be performed by a proprietary application provided or supplied by a service provider such as a PSP or a taxi company. That is, the fare input by the payee may be modified into an offered, redeemable or discounted fare by a proprietary application in an alternative embodiment. In such an alternative embodiment, at step 210, the mobile device 13 may alternatively display a discounted fare (or offered fare, redeemed fare etc.) based on payment information that is modified by the proprietary application (rather than payment information that is modified by and transmitted from the payment processor 18). For example, a proprietary application installed on the mobile device 13 may apply a discount voucher from a pass in the Passbook application, before displaying a discounted fare at step 210.

At step 230, upon acceptance of the discounted fare, the mobile device 13 detects whether or not there is an application (a pre-installed application) installed on the mobile device 13 for making a payment of the discounted fare. In this embodiment, the pre-installed application is provided by the bank of the payor. However, it is envisaged that the pre-installed application may alternatively be provided by another entity including a service provider (such as a taxi company), a credit or charge card issuer, a PSP such as PayPal, a mobile device hardware provider, a mobile device operating system provider etc.

At step 250, upon detection by the mobile device 13 that there is a pre-installed application for making a payment of the discounted fare, the mobile device 13 provides information including payer details to the pre-installed application. In this respect, it is envisaged that other information such as payee details (such as specific merchant details for making a payment to the relevant payee) or the preferred payment method of the payor (for example, via a preferred credit card) may be additionally or alternatively provided to the pre-installed application.

At step 280, upon detection by the mobile device 13 that there is no pre-installed application for making a payment of the discounted fare, the mobile device 13 automatically downloads a new application provided by a PSP, installs the new application on the mobile device 13, and provides information such as payor and payee details to the new application for paying the discounted fare. A person skilled in the art will appreciate that it may be necessary to create an account and/or specify a preferred payment method or methods before making the payment.

At step 290, upon payment of the discounted fare, a receipt or acknowledgement of payment is transmitted (for example, via email or SMS) to the mobile device 13 and/or the payee device 19, It is envisaged that the receipt or acknowledge may also be displayed by the mobile device 13, the payee device 19, or both the mobile device 13 and the payee device 19, upon receipt of the receipt or acknowledgement.

Turning now to FIGS. 6 to 8 of the drawings, there is shown an embodiment of a system 1000 for identifying one of a plurality of service providers (such as taxi drivers). The system 1000 comprises a plurality of identifier transmitters 17 (such as a plurality of iBeacons) located at different locations for respective use by the service providers (in particular, in a plurality of taxis respectively associated with the taxi drivers), and a transmitter identifying device 1800 in communication with a mobile device 1300 (such as smartphone in the form of an iPhone) and a querying device (which is the mobile device 1300 in this embodiment, but may be another device in an alternative embodiment). The transmitter identifying device 1800 is configured to, upon receipt from the mobile device 1300 of a first identifier (such as a taxi driver identifier) corresponding to one of the identifier transmitters 17 and a second identifier (such as a MAC address or device ID of an iPhone) corresponding to the mobile device 1300, associate the first identifier with the second identifier in a memory 1600. The transmitter identifying device 1800 is also configured to, in response to receipt of an identifier request transmitted from the querying device, generates a transmitter notification based on the first identifier associated with the second identifier in the memory, and transmit the transmitter notification to the querying device 1300. Advantageously, the system 1000 enables an identification of an identifier transmitter 17 (and hence, the service provider using the identifier transmitter 17) of which the mobile device 1300 is within range, after the first identifier corresponding to the identifier transmitter 17 is associated with the second identifier corresponding to the mobile device 1300 in the memory 1600.

It is envisaged that the transmitter identifying device 1800 is typically implemented by a computing device such as a computer server (which may be located remotely or via "cloud computing"), a desktop personal computer; a portable computer (such as a laptop computer, a notebook computer or a tablet computer), or a mobile computing device (such as a smartphone), a programmable circuit etc. Persons skilled in the art will appreciate that the transmitter identifying device 1800 may be implemented by multiple computing devices such that each computing device implements only a part or parts of the transmitter identifying device 1800, FIG. 6 is a schematic diagram of the physical architecture of an embodiment of the system 1000. The system 1000 comprises a transmitter identifying device 1800 connected to a transmitter identifying device memory 1600 and a network 15 in the form of the Internet. The system 1000 also comprises a plurality of identifier transmitters 17 for use by respective service providers in the form of respective taxi drivers. In this embodiment, the system 1000 takes advantage of the iBeacon arrangement, the Passbook application (which in an alternative embodiment may be a proprietary application provided or supplied by a service provider such as a taxi company or a PSP), and each of the identifier transmitters 17 is an iBeacon that is adapted to broadcast notifications within a taxi using a short range communication standard in the form of either BLE or Bluetooth Smart. As indicated above in respect of the method and system for enabling a payment, the use of BLE or Bluetooth Smart by an identifier transmitter 17 is advantageous in that it enables the transmitter identifier 17 to have a range (as illustrated by the dotted lines surrounding the identifier transmitter 17 in FIG. 6) that is suitable for broadcasting signals within a taxi, a maximum data rate that is high enough for broadcasting iBeacon signals (about 1 megabits-per-second), and relatively low peak current consumption (about 15 milliamperes). It is envisaged that the identifier transmitter 17 and the mobile device 1300 may not be compatible with the Passbook application in an alternative embodiment, and may alternatively or additionally be compatible with an equivalent application such as Google Wallet in an alternative embodiment.

In this embodiment, the system 1000 also comprises a mobile device 1300 in the form of an iPhone for use by a user in the form of a passenger in the taxi, and the mobile device 1300 and the transmitter identifying device 1800 are in wireless communication with the network 15 via a cellular data communication network in the form of a LTE network. It is envisaged that the mobile device 1300 and the transmitter identifying device 1800 may alternatively be connected by a wireless local area network such as Wi-Fi in an alternative embodiment.

The system 1000 also comprises a querying device that is arranged to send an identifier request requesting the transmitter identifying device 1800 for an identification of one of the plurality of identifier transmitters 17 used by the respective service providers. In this embodiment, the mobile device 1300 is also the querying device. However, it is envisaged that the querying device may be another device such as another mobile device.

It is envisaged that an alternative embodiment of the system 1000 may comprise more than one mobile device 1300, just one identifier transmitter 17, and/or more than one transmitter identifying device 1800. Also, it is envisaged that an alternative embodiment of the system 1000 may take advantage of an arrangement other than the iBeacon arrangement such that notifications from one or more of the identifier transmitters 17 may not be broadcast using BLE or Bluetooth Smart as specified by the iBeacon arrangement, but using other short range communication standards as specified by an alternative arrangement. In this respect, a person skilled in the art will appreciate that any alternative communication standard having a suitable range (for example, one having a range of at least 1 meter, or one having a maximum of about 100 meters) to broadcast the notifications within a taxi to a passenger of the taxi may be used. Examples of such alternative communication standards include other mobile or cellular data communication standards such as UMTS. It is also envisaged that other communication methods such as barcodes or QR codes may be used in alternative embodiments. Also, persons skilled in the art will appreciate that the transmitter identifying device memory 1600 may be implemented by a single device (for example, as part of the transmitter identifying device 1800) or by separate devices.

The system 1000 comprises a number of functional components for identifying one of the identifier transmitters 17. It is envisaged that the functional components are typically implemented by a processor of a device executing program code and data stored in a memory of the device. However, persons skilled in the art will appreciate that this need not be the case. For example, one or more of the components could be implemented in an alternative manner, for example, as a dedicated circuit. FIG. 7 is a schematic diagram showing the functional components of the system 1000. In FIG. 7, only one of the identifier transmitters 17 is shown.

Beginning first with the functional components of the mobile device 1300 of the system 1000, the mobile device 1300 comprises a processor 3900 and a communication interface 3800. The processor 3900 of the mobile device 1300 is arranged to implement functional components in the form of a broadcast identifier matcher 3100, an information request generator 3300, an identifier notification generator 3500, and an identifier request generator 3700 based on program code and data stored in a memory (not shown in FIG. 7) of the mobile device 1300. In this embodiment, the functional components implemented by the processor 3900 are provided by a combination of a proprietary application provided by a service provider and the Passbook application. That is, each one of the functional components is provided by the Passbook application, the proprietary application, or a combination of the Passbook application and the proprietary application. It is envisaged that the components may be provided in some other way in an alternative embodiment. For example, in an alternative embodiment, the functional components may all be provided by a proprietary application.

As indicated above, the identifier transmitter 17 is adapted to broadcast notifications using BLE or Bluetooth Smart as specified according to the iBeacon arrangement. In particular, the identifier transmitter 17 is arranged to broadcast a first identifier in the form of an identifier (a transmitter identifier) of the identifier transmitter 17 over a BLE or Bluetooth Smart communication channel. In this embodiment, the transmitter identifier is a taxi driver ID. However, it is envisaged that the identifier transmitter 17 may alternatively be an identifier of the taxi, or any identifier corresponding to either an identifier transmitter 17 or a user of an identifier transmitter 17 in an alternative embodiment.

In use, the transmitter identifier is associated with the identifier transmitter 17 before the transmitter identifier is broadcast by the identifier transmitter 17. In this embodiment, the transmitter identifier is an identifier stored in association with information relating to the identifier transmitter 17 in the transmitter identifying device memory 1600. In this embodiment, the information relating to the identifier transmitter 17 is information relating to a taxi driver. However, it is envisaged that the information relating to the identifier transmitter 17 may alternatively be information relating to a taxi or some other information in an alternative embodiment.

In this embodiment, the transmitter identifier is provided to the identifier transmitter 17 by connecting the identifier transmitter 17 to the transmitter identifying device 1800, and outputting the transmitter identifier together with the information relating to the identifier transmitter 17 from the transmitter identifying device 1800 to the identifier transmitter 17. It is envisaged that the transmitter identifier may be associated with the identifier transmitter 17 in other ways. For example, the transmitter identifier may be an identifier that is predetermined (that is, previously assigned to the identifier transmitter 17 without any setup by the manufacturer of the identifier transmitter 17) in an alternative embodiment. In such an alternative embodiment, the transmitter identifier may be outputted from the identifier transmitter 17 to the transmitter identifying device 1800, and the predetermined transmitter identifier may be associated with information relating to the identifier transmitter 17 stored in the transmitter identifying device memory 1600 after connecting the identifier transmitter 17 to the transmitter identifying device 1800.

The mobile device 1300 is adapted to monitor the BLE or Bluetooth Smart communication channel for receipt of a broadcast of a transmitter identifier. As indicated above, the mobile device 1300 is an iPhone with the Passbook application (or proprietary application in an alternative embodiment) installed in the mobile device 1300. In this embodiment, the Passbook application (or proprietary application in an alternative embodiment) monitors the BLE or Bluetooth Smart communication channel for receipt of a broadcast signal that includes a broadcast identifier in the form of a UUID and the transmitter identifier. It is envisaged that, in an alternative embodiment, the broadcast signal may include other identifiers such as a taxi driver ID, a taxi ID, or both a taxi driver ID and a taxi ID.

The communication interface 3800 of the mobile device 1300 is adapted to receive the broadcast signal broadcast from the identifier transmitter 17. The broadcast identifier matcher 3100 of the mobile device 1300 is adapted to, upon receipt by the communication interface 3800 of the mobile device 1300 of the broadcast signal, determine whether the broadcast identifier (that is, the UUID) of the broadcast signal matches or corresponds to a designated broadcast identifier (that is, a designated UUID). The broadcast identifier matcher 3100 is also arranged to, in response to a determination by the broadcast identifier matcher 3100 that the UUID of the broadcast signal corresponds to a designated UUID, display an identifier request in the form of a notification to display the information relating to the identifier transmitter 17 corresponding to the transmitter identifier of the broadcast signal transmitted by the identifier transmitter 17. As indicated above, the broadcast matcher 3100 may be implemented by a proprietary application or the Passbook application depending on the embodiment.

The information request generator 3300 of the mobile device 1300 is arranged to, upon receipt by the mobile device 1300 of a user input from the user of the mobile device (that is, the passenger of the taxi) to display the information relating to the identifier transmitter 17, Generate an information request comprising the transmitter identifier of the broadcast signal received from the identifier transmitter 17, and control the communication interlace 3800 to transmit over a communication channel through the LTE network and the Internet 15 to the transmitter identifying device 1800 the information request to request for the information relating to the identifier transmitter 17. As indicated in greater detail below, the transmitter identifying device 1800 is arranged to respond to the information request with the information relating to the identifier transmitter 17.

The identifier notification generator 3500 of the mobile device 1300 is arranged to, upon receipt of the information relating to the identifier transmitter 17 by the communication interface 3800 of the mobile device 1300, generate an identifier notification comprising the transmitter identifier of the broadcast signal received from the identifier transmitter 17 and the mobile device identifier, and to control the communication interface 3800 of the mobile device 1300 to transmit the identifier notification over the communication channel through the LTE network and the Internet 15 to the transmitter identifying device 1800. The identifier notification generator 3500 is also arranged to control the mobile device 1300 to display to the user of the mobile device 1300 the information relating to the identifier transmitter 17 via the Passbook app (or alternatively via a proprietary application provided or supplied by a service provider such as a taxi company or a PSP, an equivalent app such as Google Wallet or a web browser app in an alternative embodiment).

As indicated above, in this embodiment, the mobile device 1300 is also a querying device that requests the transmitter identifying device 1800 for an identification of one of the plurality of identifier transmitters 17. In use, it is envisaged that such a request or query would typically be made sometime after association of the transmitter identifier and the mobile device identifier has been made. That is, it is envisaged that there will normally be a time delay between the time when a transmitter identifier has been associated with a mobile device identifier and when an identification of the identifier transmitter 17 corresponding to the associated transmitter identifier is requested. The identifier request generator 3700 of the mobile device 1300 is arranged to generate an identifier request comprising the mobile device identifier, and to control the communication interface 3800 to transmit the identifier request to the transmitter identifying device 1800. In this embodiment, the identifier request is transmitted by the querying device (that is, the mobile device 1300) over a communication channel through the LTE network and the Internet 15 to the transmitter identifying device 1800.

The communication interface 3800 of the mobile device 1300 is also arranged to receive from the transmitter identifying device 1800 a transmitter notification including the information relating to the identifier transmitter 17. As discussed in greater detail below, the transmitter notification is generated based on a transmitter identifier associated with the mobile device identifier in the transmitter identifying device memory 1600. It is envisaged that the transmitter notification may include other information. For example, in an embodiment where the information relating to the identifier transmitter 17 is information relating to a taxi driver, the transmitter notification may additionally include information relating to a taxi corresponding to the taxi driver. The mobile device 1300 is also arranged to, upon receipt of the transmitter notification, display information derivable from the transmitter notification on a webpage via a web browser application implemented by the mobile device 1300. It is envisaged that the information may be alternatively displayed, for example, by another application implemented on the mobile device 1300, for example, the proprietary application provided or supplied by the transmitter identifying device 1800, the Passbook application, Google Wallet etc.

Depending on the embodiment, the identifier request, the information request and the identifier notification may be transmitted over the same communication channel through the LTE network and the Internet 15 connecting the mobile device 1300 to the transmitter identifying device 1800, or over different communication channels, through different network or networks, or over different communication channels and through different network or networks. For example, any one or more of the identifier request, the information request and the identifier notification may alternatively be transmitted through a wireless local area network (rather than the LTE network) and the Internet 15.

Turning now to the functional components of the transmitter identifying device 1800 of the system 1000, the transmitter identifying device 1800 comprises a processor 8900 and a communication interface 8800. The processor 8900 of the transmitter identifying device 1800 is arranged to implement functional components in the form of an identifier associator 8500, a transmitter notification generator 8700, and a transmitter information generator 8300 based on program code and data stored in the transmitter identifying device memory 1600 connected to the transmitter identifying device 1800.

The communication interface 8800 of the transmitter identifying device 1800 is adapted to receive the information request transmitted from the mobile device 1300, the identifier notification transmitted from the mobile device 1300, and the identifier request transmitted from the querying device (which is the mobile device 1300 in this embodiment). The transmitter information generator 8300 is arranged to, in response to receipt by the communication interface 8800 of the information request transmitted from the mobile device 1300, generate information relating to the identifier transmitter 17 (that is, information relating to the driver of the taxi) by locating and retrieving the information relating to the identifier transmitter 17 from the transmitter identifying device memory 1600 based on the transmitter identifier of the information request received from the mobile device 1300, and control the communication interface 8800 to transmit the information relating to the identifier transmitter 17 to the mobile device 1300, The identifier associator 8500 is arranged to, in response to receipt by the communication interface 8800 of the identifier notification transmitted from the mobile device 1300, associate the transmitter identifier of the identifier notification with the mobile device identifier of the identifier notification in the transmitter identifying device memory 1600 connected to the transmitter identifying device 1800 (for example, by storing the mobile device identifier against a data record corresponding to the transmitter identifier in the transmitter identifying device memory 1600). The transmitter notification generator 8700 is adapted to, in response to receipt by the communication interface 8800 of the identifier request transmitted from the querying device (which is the mobile device 1300 in this embodiment), generate a transmitter notification based on the transmitter identifier associated with the mobile device identifier of the identifier request (for example, by locating and retrieving from the transmitter identifying device memory 1600 the transmitter identifier associated with the mobile device identifier of the identifier request, and generating a transmitter notification comprising the retrieved transmitter identifier), and control the communication interface 8800 to transmit the transmitter notification to the querying device.

FIG. 8 is a flow chart of an embodiment of the method of identifying one of a plurality of identifier transmitters, carried out using the system of FIGS. 1 and 2. At step 800, a designated UUID is defined for enabling an identification of any one of the plurality of identifier transmitters 17 of the system 1000. At step 880, each identifier transmitter 17 is provided or supplied with the designated UUID. In this embodiment, the designated UUID is provided to each identifier transmitter 17 by connecting the identifier transmitter 17 to the transmitter identifying device 1800 and outputting the designated UUID from the transmitter identifying device 1800 to each identifier transmitter 17. Each identifier transmitter 17 is a standalone device (specifically, an iBeacon) located in a taxi in this embodiment. However, as indicated above, it is envisaged that each identifier transmitter 17 may not be a standalone device. For example, as indicated above in respect of FIGS. 1 to 5, each identifier transmitter 17 may be connected to a device of a service provider in the form of an iPhone. In this respect, it is also envisaged that, each identifier transmitter 17 may not be an iBeacon, but an iPhone with a proprietary application installed in the phone in an alternative embodiment.

At step 890, a broadcast signal comprising a broadcast identifier in the form of a UUID and an identifier of the identifier transmitter 17 (that is, the transmitter identifier) is broadcast by the identifier transmitter 17. As indicated above, the identifier transmitter is an iBeacon, and the broadcast signal is broadcast using a BLE or Bluetooth Smart communication channel. As indicated above, it is envisaged that the identifier transmitter may not be an iBeacon, and the broadcast signal may alternatively or additionally be broadcast using other communication channels such as a Wi-Fi communication channel or NFC.

As indicated above, a proprietary application and the Passbook application are installed on the mobile device 1300 in this embodiment. At step 900, the Passbook application installed on the mobile phone 1300 monitors a communication channel in the form of a BLE or Bluetooth Smart communication channel for receipt of a broadcast signal from an identifier transmitter 17 (that is, an iBeacon), the broadcast signal comprising a broadcast identifier in the form of a UUID, and a transmitter identifier.

At step 910, the broadcast identifier matcher 3100 implemented by the processor 3900 of the mobile device 1300 (which depending on the embodiment could be part of the Passbook application or the proprietary application installed in the mobile device 1300) determines whether or not the UUID of the broadcast signal matches or corresponds to the designated UUID provided or supplied to each of the identifier transmitters 17 at step 800. If the mobile device 1300 determines that the UUID of the broadcast signal does not match or correspond to the designated UUID, the mobile device 1300 monitors the communication channel for receipt of another broadcast signal. Otherwise, if the mobile device 1300 determines that the UUID of the broadcast signal matches or corresponds to the designated UUID, the broadcast identifier matcher 3100 controls the mobile device 1300 to display an identifier request in the form of a notification (such as a pop-up window if the mobile device 1300 is being currently in use, or a notice on a lock screen displayed by the mobile device 1300 if the mobile device 1300 is not currently in use) to display information relating to the identifier transmitter 17 (for example, a notification to display via the Passbook application a pass comprising information relating to the driver of the taxi). As indicated above, it is envisaged that the information relating to the identifier transmitter 17 may include other information including information relating to the taxi, an affiliated transportation company, PSP etc. As indicated above, it is envisaged that, in an alternative embodiment, the information relating to the identifier transmitter 17 may be displayed by a proprietary application that is provided or supplied by a service provider and is installed on the mobile device 1300. In this respect, it is envisaged that the information relating to the identifier transmitter 17 may not only include information relating to the driver of the taxi, but also other information such as information relating to a service provider such as a taxi company.

At step 920, the mobile device 1300 receives an input from the user (that is, a passenger in the taxi) using the mobile device 1300 to display via either the Passbook application or the proprietary application information relating to the identifier transmitter 17 that is broadcasting the broadcast signal at step 890. If the mobile device 1300 does not receive an input to display the information relating to the identifier transmitter 17, the mobile device 1300 continues to display the notification to display information relating to the identifier transmitter 17 that is broadcasting the broadcast signal at step 890, until the mobile device 1300 no longer receives the broadcast signal from the identifier transmitter 17.

Otherwise, upon receipt by the mobile device 1300 of the input from the user of the mobile device 1300 to display the information relating to the identifier transmitter 17 at step 920, the information request generator 3300 of the processor 3900 of the mobile device 1300 generates an information request comprising the transmitter identifier of the broadcast signal received from the identifier transmitter 17 that is broadcasting the broadcast signal at step 890 and controls the communication interface 3800 to transmit the information request to the transmitter identifying device 1800 to request the transmitter identifying device 1800 for the information relating to the identifier transmitter 17 at step 923. The information request is then received by the communication interface 8800 of the transmitter identifying device 1800. Upon receipt of the information request by the transmitter identifying device 1800, the transmitter information generator 8300 implemented by the processor 8900 of the transmitter identifying device 1800 then generates the information relating to the identifier transmitter 17 corresponding to the transmitter identifier of the information request received from the mobile device 1300, and controls the communication interface 8800 of the transmitter identifying device 1800 to transmit the generated information to the mobile device 1300.

At step 925, the information relating to the identifier transmitter 17 is received by the communication interface 3800 of the mobile device 1300.

At step 930, upon receipt of the information relating to the identifier transmitter 17 by the communication interface 3800 of the mobile device 1300, the identifier notification generator 3500 of the mobile device 1300 controls the mobile device 1300 to generate a identifier notification comprising the transmitter identifier of the broadcast signal received from the identifier transmitter 17 and an identifier (a mobile device identifier) corresponding to either the mobile device 1300 or the user of the mobile device 1300. The identifier notification generator 3500 then controls the communication interface 3800 to transmit the identifier notification over a communication channel through the LIE network and the Internet 15 to the transmitter identifying device 1800.

At step 940, the identifier notification transmitted by the mobile device 1300 is received by the communication interface 8800 of the transmitter identifying device 1800. The identifier associator 8500 of the transmitter identifying device 1800, upon receipt of the identifier notification transmitted by the mobile device 1300, associates the transmitter identifier of the identifier notification with the mobile device identifier of the identifier notification by storing the transmitter identifier of the identifier notification in association with the mobile device identifier of the identifier notification in the transmitter identifying device memory 1600 connected to the transmitter identifying device 1800. At or around the same time, the identifier notification generator 3500 of the mobile device 1300 controls the mobile device 1300 to display the information relating to the identifier transmitter 17 that was received at step 925.

At step 950, the mobile device 1300 receives an input from a user of a querying device (which in this embodiment is the user using the mobile device 1300) to request the transmitter identifying device 1800 for an identification of one of the plurality of identifier transmitters 17 used by the respective service providers. Upon receipt of the input by the mobile device 1300 for the identification of one of the plurality of identifier transmitters 17, the identifier request generator 3700 of the mobile device 1300 generates an identifier request comprising the mobile device identifier at step 960. Then, the identifier request generator 3700 controls the communication interface 3800 to transmit the generated identifier request from the mobile device 1300 to the transmitter identifying device 1800. As indicated above, it is envisaged that the identifier request may include other information, for example, information about why identification of one of the identifier transmitters 17 is requested. As indicated by the dotted lines in FIG. 8, the input from the user is subsequently received by the mobile device 1300 sometime after association of the transmitter identifier and the mobile device identifier has been made at step 940. Thus, there is a time delay between the time when a transmitter identifier has been associated with a mobile device identifier and when an identification of the identifier transmitter 17 corresponding to the associated transmitter identifier is requested.

At step 970, the communication interface 8800 of the transmitter identifying device 1800 receives the identifier request from the mobile device 1300, and the transmitter notification generator 8700 of the transmitter identifying device 1800 retrieves from the transmitter identifying device memory 1600 the transmitter identifier associated with the mobile device identifier of the identifier request received from the mobile device 1300. Then, the transmitter notification generator 8700 generates transmitter notification based on the transmitter identifier associated with the mobile device identifier, and controls the communication interface 8800 of the transmitter identifying device 1800 to transmit the transmitter notification to the querying device which in this embodiment is also the mobile device1300, in order to thereby enable the querying device (that is, the mobile device 1300 in this embodiment) to identify the identifier transmitter 17 (and hence the service provider using the identifier transmitter 17) of which the mobile device 1300 is within range.

Further aspects of the method of FIGS. 3 to 5 and/or the method of FIG. 8 will be apparent from the above description of the system. Persons skilled in the art will also appreciate that either one or both of the methods could be embodied in program code. The program code could be supplied in a number of ways, for example on a tangible computer readable medium, such as a disc or a memory (for example, that could replace part of memory) or as a data signal (for example, by transmitting it from a server).

Similarly, it will be appreciated that data in memory (such as the data in the payment processor memory and/or the transmitter identifying device memory) can be supplied on any appropriate tangible data carrier, such as by writing them to a portable device (such as a USB drive), storing them in a memory (including transmitting identifiers to a device having a memory) etc.

Modifications within the scope of the invention may be readily effected by those skilled in the art. It is to be understood, therefore, that this invention is not limited to the particular embodiments described by way of example hereinabove.

It is to be understood that, if any prior art is referred to herein, such reference does not constitute an admission that the prior art forms a part of the common general knowledge in the art in any country.

In the claims which follow and in the preceding description of the invention, except where the context requires otherwise due to express language or necessary implication, the word "comprise" or variations such as "comprises" or "comprising" is used in an inclusive sense, that is to specify the presence of the stated features but not to preclude the presence or addition of further features in various embodiments of the invention.

The invention claimed is:

1. A method of identifying one of a plurality of service providers using respective identifier transmitters; comprising:
    monitoring a first communication channel for receipt of a broadcast of a first identifier corresponding to one of the plurality of identifier transmitters;
    upon receipt of the first identifier, generating an identifier notification comprising the first identifier and a second identifier corresponding to a mobile device, and transmitting the identifier notification over a second communication channel to a transmitter identifying device;
    in response to receipt of the identifier notification at the transmitter identifying device, associating the second identifier of the identifier notification with the first identifier of the identifier notification in a memory;
    receiving from a querying device an identifier request comprising the second identifier; and
    in response to receipt of the identifier request, generating a transmitter notification based on the first identifier associated with the second identifier in the memory, and transmitting the transmitter notification to the querying device,
    wherein the querying device is not the mobile device.

2. The method as claimed in claim 1, wherein the identifier request is transmitted from the mobile device to the transmitter identifying device over the second communication channel.

3. The method as claimed in claim 1, wherein the transmitter notification comprises the first identifier associated with the second identifier in the memory.

4. The method as claimed in claim 1, further comprising determining the location of the identifier transmitter corresponding to the first identifier associated with the second identifier in the memory, and wherein the transmitter notification comprises data indicative of the determined location.

5. The method as claimed in claim 1, wherein the first identifier is an identifier of and broadcast by the identifier transmitter corresponding to the first identifier.

6. The method as claimed in claim 1, wherein the second identifier is at least one of an identifier of the mobile device and an identifier of a user of the mobile device.

7. The method as claimed in claim 1, wherein the identifier notification is generated and transmitted by the mobile device.

8. The method as claimed in claim 1, wherein the querying device is another mobile device.

9. The method as claimed in claim 1, further comprising, in response to receipt of the transmitter notification at the querying device, controlling the querying device to display the identifier transmitter corresponding to the first identifier.

10. The method as claimed in claim 9, wherein the identifier transmitter corresponding to the first identifier is displayed by an application implemented on or by the querying device.

11. The method as claimed in claim 1, further comprising controlling the mobile device to display a second identifier request, in response to receipt from the first identifier transmitter of the broadcast of the first identifier.

12. The method as claimed in claim 11, wherein the second identifier request comprises identifier transmitter information relating to the identifier transmitter corresponding to the first identifier.

13. The method as claimed in claim 1; wherein the broadcast of the first identifier comprises a broadcast identifier, and the method further comprises determining that the broadcast identifier corresponds to a designated broadcast identifier.

14. The method as claimed in claim 13, wherein the broadcast identifier is a universally unique identifier (UUID) and the designated broadcast identifier is a designated UUID.

15. The method as claimed in claim 1, further comprising:
    receiving a first user input to generate and transmit the identifier notification,
    wherein the identifier notification is generated and transmitted from the mobile device to the transmitter identifying device in response to receipt of the first user input.

16. The method as claimed in claim 1, further comprising:
    receiving a second user input to generate and transmit the identifier request,
    wherein the identifier request is generated and transmitted from the querying device to the transmitter identifying device in response to receipt of the second user input.

17. The method as claimed in claim 1, wherein at least one of the first communication channel and the second communication channel are different communication channels, and the identifier transmitters are located in different locations.

18. A system for identifying one of a plurality of service providers, comprising:
    a plurality of identifier transmitters for respective use by the service providers, each identifier transmitter arranged to broadcast a first identifier over a first communication channel;
    a mobile device arranged to:
        monitor the first communication channel for receipt of a broadcast of the first identifier corresponding to one of the plurality of identifier transmitters; and
        upon receipt of the first identifier; generate an identifier notification comprising the first identifier and a second identifier corresponding to the mobile device, and transmit the identifier notification over a second communication channel; and a transmitter identifying device comprising:
  a communication interface arranged to:
    receive, from a mobile device over a second communication channel, an identifier notification comprising a first identifier corresponding to one of the plurality of identifier transmitters and a second identifier corresponding to the mobile device, the first identifier being previously broadcast to the mobile device over a first communication channel, and
    receive, from a querying device, an identifier request comprising the second identifier;
  an identifier associator arranged to, in response to receipt of the identifier notification transmitted from the mobile device over the second communication channel, associate the second identifier of the identifier notification with the first identifier of the identifier notification in a memory; and
  a transmitter notification generator arranged to, in response to receipt of the identifier request transmitted from the querying device, generate a transmitter notification based on the first identifier associated with the second identifier in the memory, for transmission to the querying device,
  wherein the querying device is not the mobile device.

19. A transmitter identifying device for identifying one of a plurality of service providers using respective identifier transmitters, comprising:
  a communication interface arranged to:
    receive, from a mobile device over a second communication channel, an identifier notification comprising a first identifier corresponding to one of the plurality of identifier transmitters and a second identifier corresponding to the mobile device, the first identifier being previously broadcast to the mobile device over a first communication channel; and
    receive, from a querying device, an identifier request comprising the second identifier;
  an identifier associator arranged to, in response to receipt of the identifier notification transmitted from the mobile device over the second communication channel, associate the second identifier of the identifier notification with the first identifier of the identifier notification in a memory; and
  a transmitter notification generator arranged to, in response to receipt of the identifier request transmitted from the querying device, generate a transmitter notification based on the first identifier associated with the second identifier in the memory, for transmission to the querying device,
  wherein the querying device is not the mobile device.

20. A querying device for identifying one of a plurality of service providers using respective identifier transmitters, comprising:
  an identifier request generator arranged to generate an identifier request comprising a second identifier corresponding to a mobile device, and
  a communication interface arranged to transmit the identifier request to a transmitter identifying device, and receive from the transmitter identifying device a transmitter notification generated based on a first identifier associated with the second identifier in a memory of the transmitter identifying device,
  wherein:
    the first identifier corresponds to one of the plurality of identifier transmitters, and is associated with the second identifier in the memory of the transmitter identifying device by the transmitter identifying device upon the mobile device transmitting an identifier notification comprising the first identifier and a second identifier over a second communication channel to the transmitter identifying device, and
    the identifier notification is transmitted by the mobile device to the transmitter identifying device upon the mobile device receiving over a first communication channel a broadcast of the first identifier.

\* \* \* \* \*